United States Patent
Zou et al.

(10) Patent No.: US 12,389,352 B2
(45) Date of Patent: Aug. 12, 2025

(54) REFERENCE TIME DELIVERY DURING MOBILITY OPERATIONS IN A TIME-SENSITIVE NETWORK (TSN)

(71) Applicant: Telefonaktiebolaget LM Ericsson (publ), Stockholm (SE)

(72) Inventors: Zhenhua Zou, Solna (SE); Nianshan Shi, Järfälla (SE); Torsten Dudda, Wassenberg (DE); John Walter Diachina, Garner, NC (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 389 days.

(21) Appl. No.: 18/015,208

(22) PCT Filed: Jul. 30, 2021

(86) PCT No.: PCT/EP2021/071468
§ 371 (c)(1),
(2) Date: Jan. 9, 2023

(87) PCT Pub. No.: WO2022/023556
PCT Pub. Date: Feb. 3, 2022

(65) Prior Publication Data
US 2023/0309037 A1    Sep. 28, 2023

Related U.S. Application Data

(60) Provisional application No. 63/058,824, filed on Jul. 30, 2020.

(51) Int. Cl.
*H04W 56/00* (2009.01)
(52) U.S. Cl.
CPC .............................. *H04W 56/0015* (2013.01)

(58) Field of Classification Search
CPC ............. H04W 56/0015; H04W 56/00; H04W 56/002
(Continued)

(56) References Cited

U.S. PATENT DOCUMENTS

2020/0351728 A1* 11/2020 Chien ................. H04W 56/001
2021/0352711 A1* 11/2021 Wu ..................... H04W 74/006
(Continued)

OTHER PUBLICATIONS

"3GPP TS 38.211 V16.1.0", 3rd Generation Partnership Project; Technical Specification Group Radio Access Network; NR; Physical channels and modulation (Release 16), Mar. 2020, pp. 1-130.
(Continued)

*Primary Examiner* — Robert J Lopata
(74) *Attorney, Agent, or Firm* — Murphy, Bilak & Homiller, PLLC

(57) ABSTRACT

Embodiments include methods for a second node configured to serve a second cell in a wireless network. Such methods include receiving, from a first node, a mobility-related message including information associated with a plurality of first reference time information messages transmitted by the first node to a user equipment (UE). Such methods include, based on the received information, determining whether the second node can support reference time information delivery to the UE in the second cell. Such methods include, based on determining that the second node can support reference time information delivery to the UE, transmitting one or more second reference time information messages to the UE, each second reference time information message including an absolute reference time and a corresponding reference event within downlink transmissions by the second node. Other embodiments include complementary methods for the first node and network nodes configured to perform such methods.

26 Claims, 16 Drawing Sheets

(58) Field of Classification Search
USPC .......................................................... 370/329
See application file for complete search history.

(56) References Cited

U.S. PATENT DOCUMENTS

| | | | |
|---|---|---|---|
| 2022/0240208 A1* | 7/2022 | Chien ................. | H04W 56/004 |
| 2023/0143942 A1* | 5/2023 | Wu .................... | H04W 52/0258 |
| | | | 370/311 |
| 2023/0217386 A1* | 7/2023 | Orsino ................ | H04W 48/12 |
| | | | 370/503 |
| 2023/0239065 A1* | 7/2023 | Diachina ............. | H04L 47/28 |
| | | | 370/503 |

OTHER PUBLICATIONS

"3GPP TS 38.321 V16.1.0", 3rd Generation Partnership Project; Technical Specification Group Radio Access Network; NR; Radio Resource Control (RRC) protocol specification (Release 16), Jul. 2020, pp. 1-151.

"3GPP TS 38.331 V16.1.0", 3rd Generation Partnership Project; Technical Specification Group Radio Access Network; NR; Radio Resource Control (RRC) protocol specification (Release 16), Jul. 2020, pp. 1-906.

"Accurate Timing Delivery for TSC", 3GPP TSG-RAN WG2 Meeting #105bis, R2-1904918, Xi'an, China, Apr. 8-12, 2019, pp. 1-2.

"Other issues related to accurate reference timing delivery in TSC", GPP TSG-RAN WG2 #107Bis, R2-1912898, Revision of R2-1908860, Chongqing, China, Oct. 14-18, 2019, pp. 1-19.

"Signalling aspects for accurate reference timing delivery in TSC", GPP TSG-RAN WG2 #107bis, R2-1912897, Revision of R2-1908859, Chongqing, China, Oct. 14-18, 2019, pp. 1-7.

"3GPP TS 38.133 V16.3.0", 3rd Generation Partnership Project; Technical Specification Group Radio Access Network; NR; Requirements for support of radio resource management (Release 16), Mar. 2020, pp. 1-1165.

"3GPP TS 23.501 V16.4.0", 3rd Generation Partnership Project; Technical Specification Group Services and System Aspects; System architecture for the 5G System (5GS); Stage 2 (Release 16), Mar. 2020, pp. 1-430.

* cited by examiner

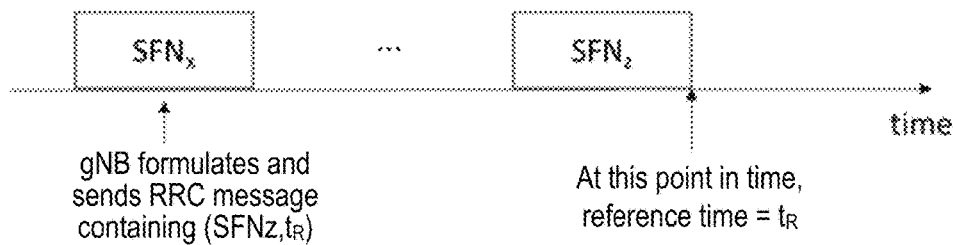

FIG. 6

```
ReferenceTimeInfo-r16 ::=    SEQUENCE {
    time-r16                 ReferenceTime-r16,
    uncertainty-r16          INTEGER (0..32767)        OPTIONAL,
    timeInfoType-r16         ENUMERATED {localClock}   OPTIONAL,
    referenceSFN-r16         INTEGER (0..1023)         OPTIONAL    -- Cond
RefTime
}

ReferenceTime-r16 ::=    SEQUENCE {
    refDays-r16              INTEGER (0..72999),
    refSeconds-r16           INTEGER (0..86399),
    refMilliSeconds-r16      INTEGER (0..999),
    refTenNanoSeconds-r16    INTEGER (0..99999)
}
```

FIG. 7

```
UEAssistanceInformation-v16xy-IEs ::= SEQUENCE {
    idc-Assistance-r16                  IDC-Assistance-r16                  OPTIONAL,
    drx-Preference-r16                  DRX-Preference-r16                  OPTIONAL,
    maxBW-Preference-r16                MaxBW-Preference-r16                OPTIONAL,
    maxCC-Preference-r16                MaxCC-Preference-r16                OPTIONAL,
    maxMIMO-LayerPreference-r16         MaxMIMO-LayerPreference-r16         OPTIONAL,
    minSchedulingOffsetPreference-r16   MinSchedulingOffsetPreference-r16   OPTIONAL,
    releasePreference-r16               ReleasePreference-r16               OPTIONAL,
    sl-UE-AssistanceInformationNR-r16   SL-UE-AssistanceInformationNR-r16   OPTIONAL,
    referenceTimeInfoPreference-r16     BOOLEAN                             OPTIONAL,
    nonCriticalExtension                SEQUENCE {}                         OPTIONAL
}
```

FIG. 8

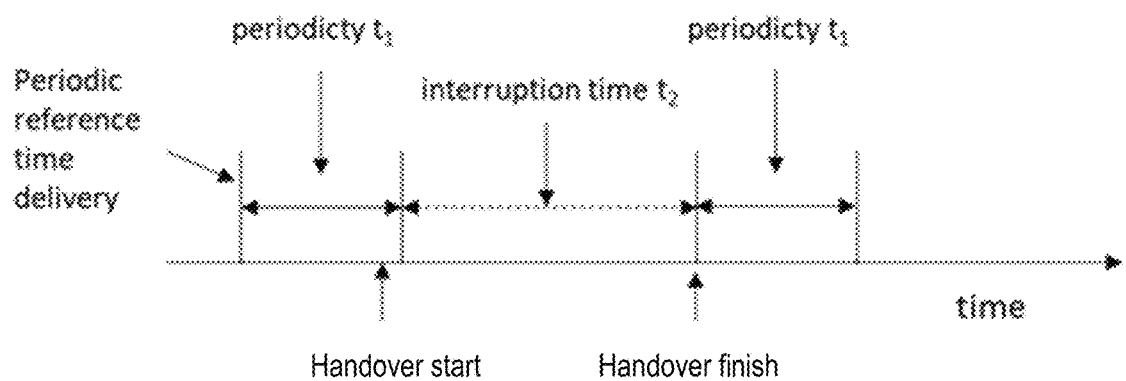

FIG. 9

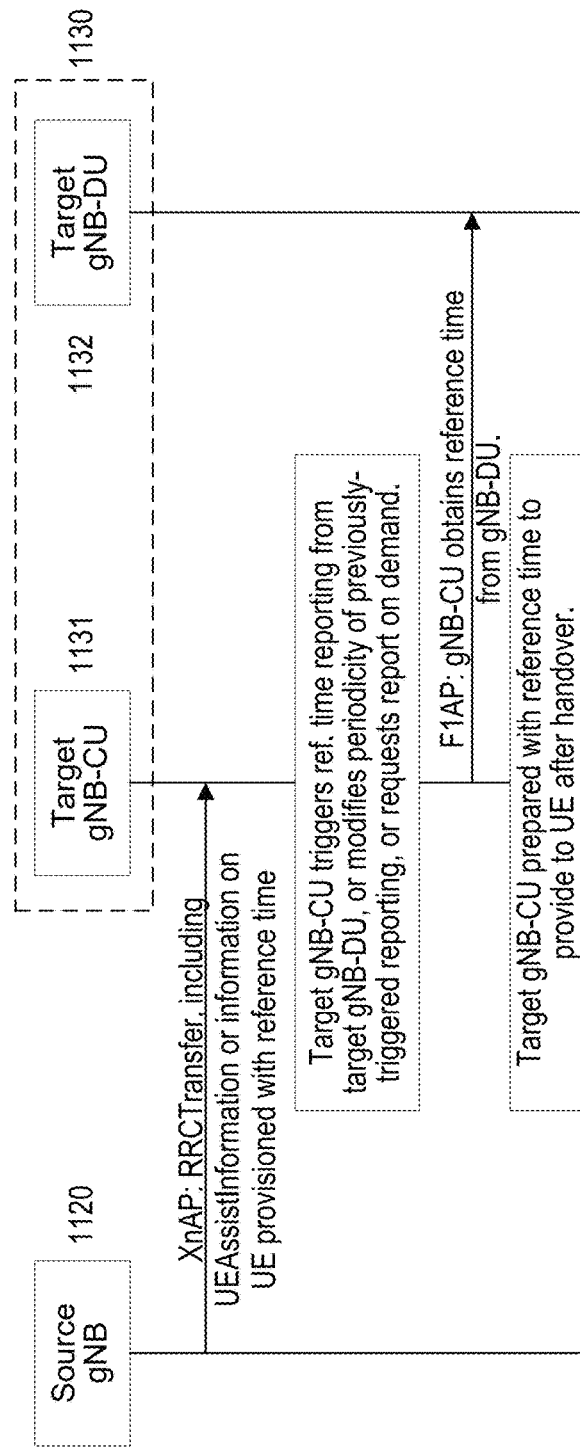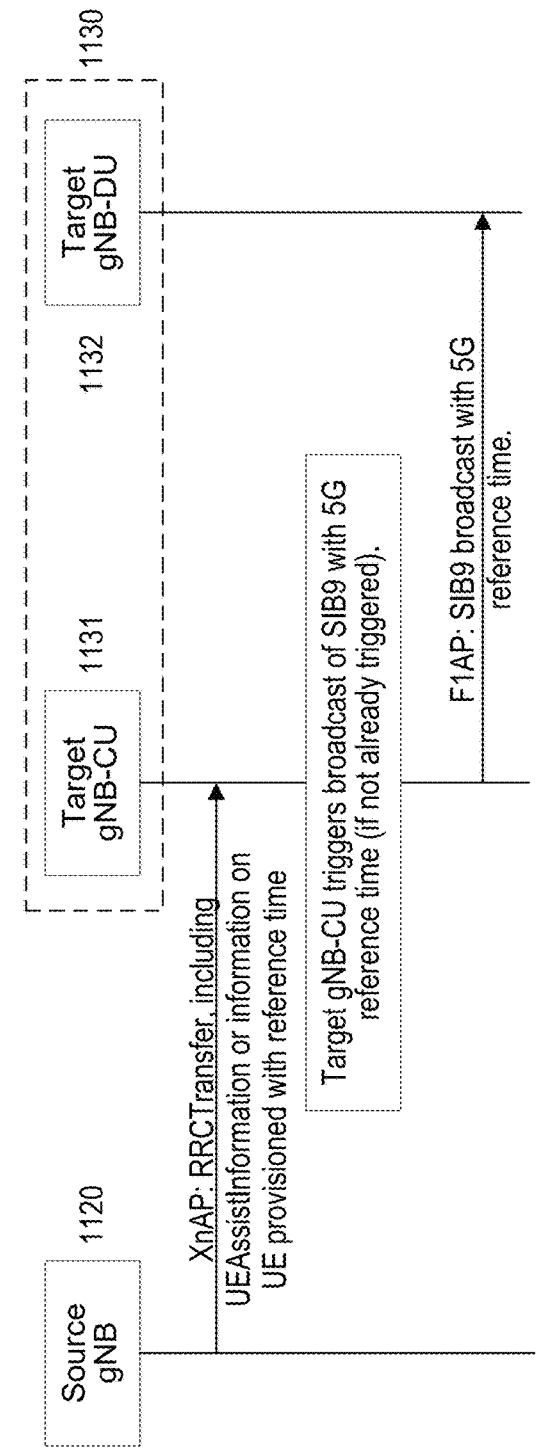
FIG. 11
FIG. 12

Fig. 14A

┌─────────────────────────────────────────────────────────────────────┐
│ Based on determining that the second node can support reference time information  │ 1480
│ delivery to the UE, performing one of various operations by a centralized unit (CU) of the │
│ second node. │
├─────────────────────────────────────────────────────────────────────┤
│ Initiating reference time information reporting by a distributed unit (DU) to the CU. │ 1481
├─────────────────────────────────────────────────────────────────────┤
│ Adjusting a periodicity of ongoing reference time information reporting by DU to CU. │ 1482
├─────────────────────────────────────────────────────────────────────┤
│ Initiating broadcasting of reference time information messages by the DU. │ 1483
├─────────────────────────────────────────────────────────────────────┤
│ Adjusting a periodicity of ongoing broadcasting of reference time information │ 1484
│ messages by the DU. │
└─────────────────────────────────────────────────────────────────────┘

┌─────────────────────────────────────────────────────────────────────┐
│ After completion of the mobility operation, sending, to the third node, a message │ 1490
│ comprising information associated with the second reference time information messages │
│ sent by the second node to the UE. │
└─────────────────────────────────────────────────────────────────────┘

*FIG. 14B*

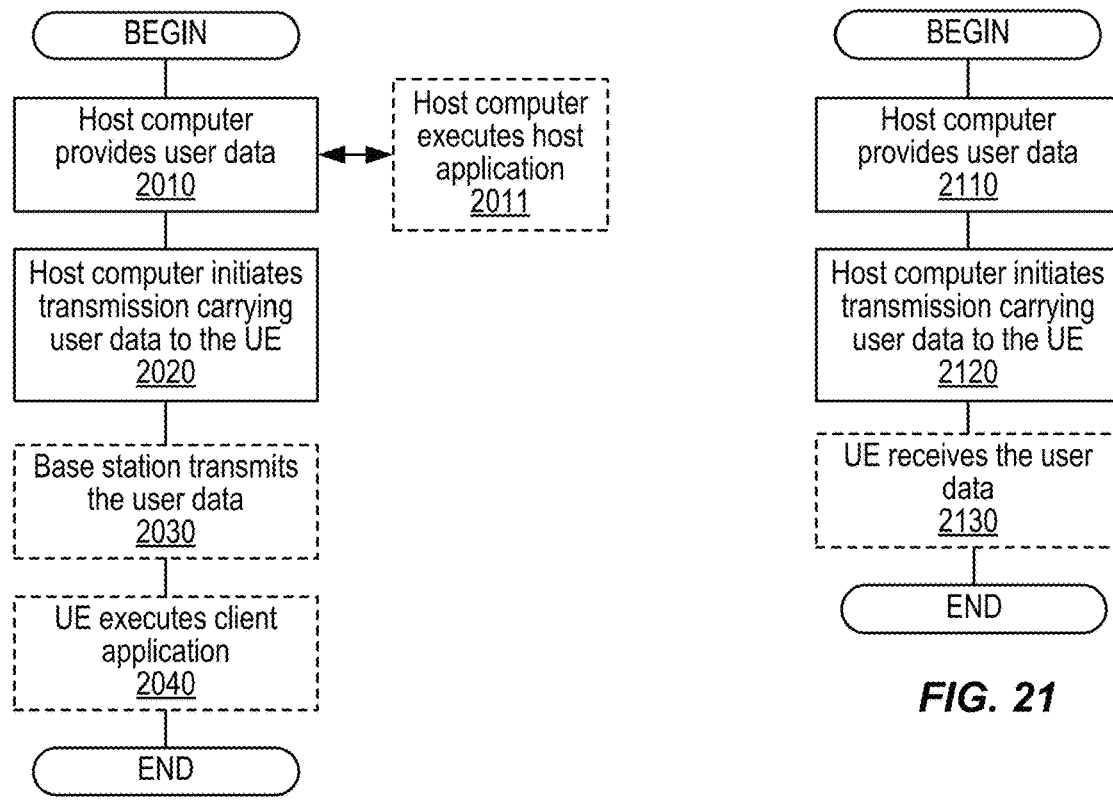
FIG. 20
FIG. 21
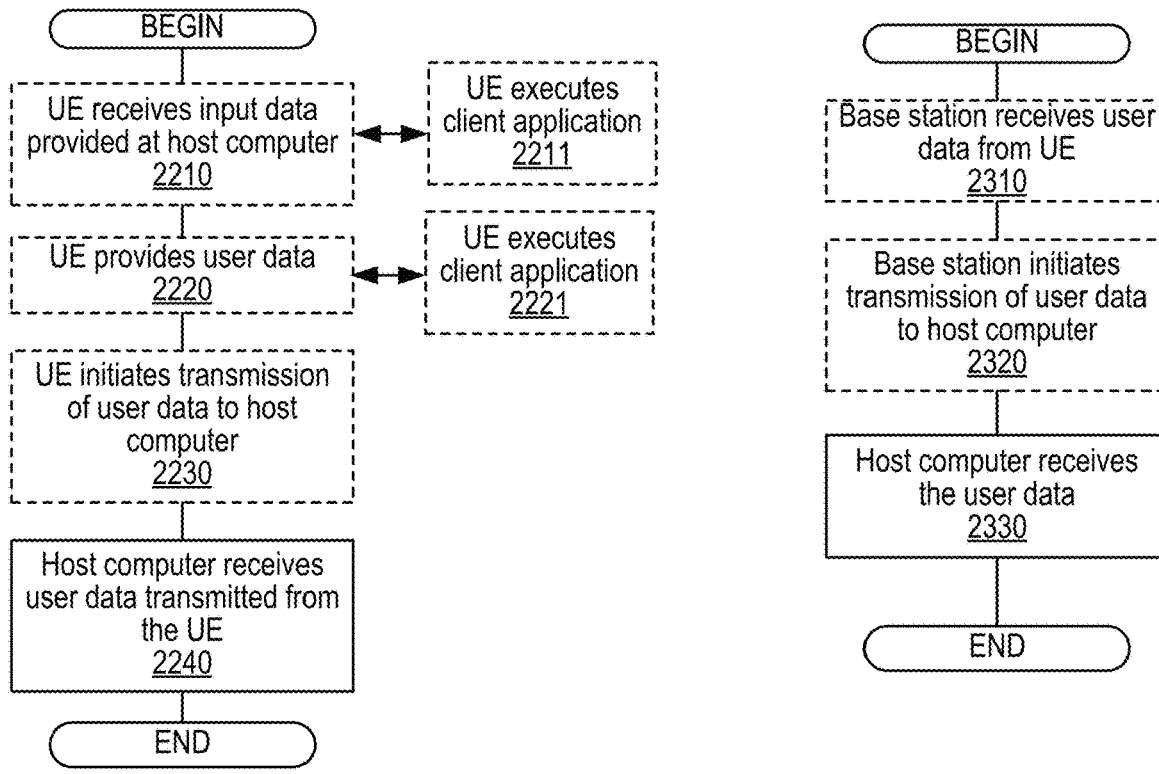
FIG. 22
FIG. 23

REFERENCE TIME DELIVERY DURING MOBILITY OPERATIONS IN A TIME-SENSITIVE NETWORK (TSN)

TECHNICAL FIELD

The present application relates generally to the field of wireless networks and more specifically to techniques for wireless networks are utilized to deliver highly accurate timing information to wireless devices from a time-sensitive network (TSN).

BACKGROUND

Industry 4.0 is a term used to refer to a current trend of automation and data exchange in manufacturing. It can include concepts and/or technologies such as cyber-physical systems, the Internet of things (IoT), cloud computing, and cognitive computing. Industry 4.0 is also referred to as the fourth industrial revolution or "I4.0" for short.

One scenario or use case for Industry 4.0 is the so-called "smart factory". Within modular structured smart factories, cyber-physical systems monitor physical processes, create a virtual copy of the physical world, and make decentralized decisions. Over the Internet of Things (IoT), cyber-physical systems communicate and cooperate with each other, and with humans, in real-time both internally and across organizational services offered and used by participants of a value chain of which the smart factory is a part. Such smart factory environment environments are also referred to as Industrial Internet of Things (IIoT).

There are four common principles associated with Industry 4.0. First, "interoperability" requires the ability to connect machines, devices, sensors, and people to communicate with each other via the IoT or, alternatively, the "Internet of People" (IoP). Second, "information transparency" requires information systems to have the ability to create a virtual copy of the physical world by enriching digital models (e.g., of a smart factory) actual with sensor data. For example, this can require the ability to aggregate raw sensor data to higher-value context information.

Third, "technical assistance" requires assistance systems to be able to support humans by aggregating and visualizing information comprehensively for making informed decisions and solving urgent problems on short notice. This principle can also refer to the ability of cyber physical systems to physically support humans by conducting a range of tasks that are unpleasant, too exhausting, or unsafe for their human co-workers. Finally, cyber physical systems should have the ability to make decentralized decisions and to perform their tasks as autonomously as possible. In other words, only in the case of exceptions, interferences, or conflicting goals, should tasks be delegated to a higher level.

These Industry 4.0 principles motivate various use cases that place many requirements on a network infrastructure. Use cases include simpler ones such as plant measurement to more difficult ones such as precise motion control in a robotized factory cell. To address these requirements, the IEEE 802.1 working group (particularly, task group TSN) has developed a Time Sensitive Networking (TSN) standard. TSN is based on the IEEE 802.3 Ethernet standard, a wired communication standard that is designed for "best effort" quality of service (QOS). TSN describes a collection of features intended to make legacy Ethernet performance more deterministic, including time synchronization, guaranteed low-latency transmissions, and improved reliability.

The TSN features available today can be grouped into the following categories (shown below with associated IEEE specifications):
Time Synchronization (e.g., IEEE 802.1AS);
Bounded Low Latency (e.g., IEEE 802.1Qav, IEEE 802.1Qbu, IEEE 802.1Qbv, IEEE 802.1Qch, IEEE 802.1Qcr);
Ultra-Reliability (e.g., IEEE 802.1CB, IEEE 802.1Qca, IEEE 802.1Qci);
Network Configuration and Management (e.g., IEEE 802.1Qat, IEEE 802.1Qcc, IEEE 802.1Qcp, IEEE 802.1CS).

FIGS. 1-2 are block diagrams that respectively illustrate Centralized and Fully Centralized TSN configuration models, as specified in IEEE Std. 802.1Qbv-2015. Within a TSN network, the communication endpoints are called "Talker" and "Listener." All the switches and/or bridges between a Talker and a Listener must support certain TSN features, such as IEEE 802.1AS time synchronization. A "TSN domain" includes all nodes that are synchronized in the network, and TSN communication is only possible within such a TSN domain.

The communication between Talker and Listener is in streams. Each stream is based on data rate and latency requirements of an application implemented at both Talker and Listener. A Talker initializes a stream towards a Listener, and the TSN configuration and management features are used to set up the stream and to guarantee the stream's requirements across the network. Some TSN features require a central management entity called Centralized Network Configuration (CNC), as shown in FIG. 1. The CNC can use, for example, Netconf and YANG models to configure the switches in the network for each TSN stream. This also facilitates the use of time-gated queueing (defined in IEEE 802.1Qbv) that enables data transport in a TSN network with deterministic latency. With time-gated queueing on each switch, queues are opened or closed according to a precise schedule thereby allowing high-priority packets to pass through with minimum latency and jitter. Of course, packets must arrive at a switch ingress port before the gate is scheduled to be open.

The fully centralized model shown in FIG. 2 also includes a Centralized User Configuration (CUC) entity used as a point of contact for Listener and Talker. The CUC collects stream requirements and endpoint capabilities from the devices and communicates with the CNC directly. Further details about TSN configuration are given in IEEE 802.1Qcc.

Currently the fifth generation ("5G") of cellular systems, also referred to as New Radio (NR), is being standardized within the Third-Generation Partnership Project (3GPP). NR is developed for maximum flexibility to support many different use cases. These include mobile broadband, machine type communication (MTC), ultra-reliable low-latency communications (URLLC), device-to-device (D2D), etc. The achievable latency and reliability performance of NR are important for these and other use cases related to IIOT and/or Industry 4.0. In order to extend NR applicability for such use cases, support for time synchronization in the 5G system via time sensitive network (TSN) has been defined in 3GPP TS 23.501 (v16.4.0).

At a high level, the 5G network architecture consists of a Next Generation radio access network (NG-RAN) and a 5G core network (5GC). The NG-RAN includes various gNodeB's (gNBs, also referred to as base stations) serving cells by which wireless devices (also referred to as user equipment, or UEs) communicate. The gNBs can be connected to the 5GC via one or more NG interfaces and can be connected to each other via one or more Xn interfaces. Each of the gNBs can support frequency division duplexing (FDD), time division duplexing (TDD), or a combination thereof.

FIG. 3 is a block diagram illustrating an exemplary division of the 5G network architecture into control plane (CP) and data (or user) plane (UP) functionality. For example, a UE (310) can communicate data packets to a device and/or application on an external network (e.g., the Internet) by sending them via the UE's serving gNB (321) in the NG-RAN (320) to a user plane function (UPF) in the 5GC. The UPF provides an interface between the 5GC and external networks.

CP functionality can operate cooperatively with the UP functionality. CP functions shown in FIG. 3 include an access management function (AMF), a session management function (SMF), a network exposure function (NEF), a policy control function (PCF), a network repository function (NRF), and a unified data management (UDM) function. The AMF can communicate with the RAN via an N2 logical interface, which can be carried over the NG interface from the gNB to the 5GC. Similarly, the UPF can communicate with the SMF via the N4 logical interface.

To support IIoT uses cases, a 5G network (e.g., NG-RAN and 5GC) should be capable of delivering highly accurate timing information from an external TSN network to TSN endpoints connected to the 5G network, e.g., via UEs. FIG. 4 is a block diagram illustrating an exemplary arrangement for interworking between the 5G network architecture shown in FIG. 3 and an exemplary fully centralized TSN network architecture. Reference numbers used in FIG. 4 have the same meaning as in FIG. 3. In the following discussion, a device connected to the 5G network is referred to as 5G endpoint, and a device connected to the TSN domain is referred to as TSN endpoint. The arrangement shown in FIG. 4 includes a Talker TSN endpoint and a Listener 5G endpoint connected to a UE. In other arrangements, a UE can instead be connected to a TSN network comprising at least one TSN bridge and at least one TSN endpoint. In this configuration, the UE can be part of a TSN-5G gateway.

The TSN can include a grandmaster clock (TSN GM) that serves as the definitive timing source for TSN endpoints. At a high level, the 5G network in FIG. 4 should appear to the connected TSN as a switch or bridge that delivers the TSN GM timing to the connected endpoints in compliance with the requirements in IEEE 802.1AS. However, the 5G network does use the TSN GM as its own timing source, but instead relies on a 5G system clock (5GSC) that is distributed among the various network nodes or functions. As such, one or more timing relationships between TSN GM and 5GSC may need to be determined and/or derived to facilitate transit of the TSN GSM to the connected end station in a compliant manner.

At a high level, the time synchronization solution defined in 3GPP TS 23.501 only requires NG-RAN nodes (e.g., gNBs) to be synchronized to the 5G network reference time (i.e., based on 5GSC) while TSN GM timing is delivered to UEs and endpoints transparently through the 5G network using higher-layer generalized precision time protocol (gPTP) signaling. For 5GSC synchronization, a UE relies on its serving gNB providing reference time periodically, either via broadcast or unicast signaling. The nominal periodicity $T_n$ of gNB reference time delivery is left to network implementation. However, $T_n$ can reflect the UE clock stability and gNB clock stability in relation to the 5G GM clock used as the basis of the 5G reference time, etc.

A common mobility procedure for UEs with an active connection is handover from a source cell served by a source node to a target cell served by a target node. Successful handovers allow the UE to move around in the coverage area of different cells without significant interruptions in data transmission. However, handover and other mobility procedures can have various robustness problems that can cause a UE's connection to a network source of reference time information to be lost temporarily. Even after a successful handover to a target cell, there can be delays in the target node preparing reference time information for delivery to the UE. These robustness problems and/or delays can cause various problems, issues, and/or difficulties for time-sensitive applications that rely on the UE being closely synchronized to 5GSC.

SUMMARY

Embodiments of the present disclosure provide specific improvements to time-sensitive networking (TSN) in a wireless environment, such as by facilitating solutions to overcome the exemplary problems summarized above and described in more detail below Embodiments include methods (e.g., procedures) for a second node (e.g., base station, eNB, gNB, etc., or components thereof) configured to serve a second cell in a wireless network (e.g., E-UTRAN, NG-RAN).

These exemplary methods can include receiving, from a first node in the wireless network, a mobility-related message comprising information associated with a plurality of first reference time information messages transmitted by the first node to a user equipment (UE). These exemplary methods can also include, based on the received information, determining whether the second node can support reference time information delivery to the UE in the second cell. These exemplary methods can also include, based on determining that the second node can support reference time information delivery to the UE, transmitting one or more second reference time information messages to the UE. Each second reference time information message can include an absolute reference time and a corresponding reference event within downlink (DL) transmissions by the second node.

In some embodiments, the reference event can be an ending boundary of a subframe of DL transmissions by the second node in a primary cell of a cell group assigned to the UE. In such embodiments, the reference time information messages are transmitted on a signaling radio bearer (SRB) associated with the cell group.

In some embodiments, the information associated with the first reference time information messages includes one or more of the following:
  a first indication of the UE's preference for receiving reference time information messages from the wireless network;
  a second indication of a periodicity of the first reference time information messages;
  a third indication of a time when a most recent first reference time information message was transmitted by the first node;
  a fourth indication of the accuracy of the first reference time information messages;
  a fifth indication of the UE's required time synchronization accuracy;

a sixth indication of a clock source for the absolute reference times in the first reference time information messages.

In some embodiments, the periodicity indicated by the second indication is at least as frequent as the UE's preferred minimum periodicity. In some embodiments, these exemplary methods can also include determining a latest time for transmitting an initial one of the second reference time information messages based on the third indication and the fifth indication.

In some embodiments, transmitting the second reference time information messages can include the following operations: transmitting at least one of the second reference time information messages; subsequently receiving, from the UE, a reference time preference message adjusting timing and/or periodicity for the second reference time information messages based on the contents of the reference time preference message; and transmitting subsequent second reference time information messages according to the adjusted timing and/or periodicity. In some embodiments, the reference time preference message can include one or more of the following:

an indication of the UE's preference for receiving periodic reference time information messages from the wireless network;
an indication of a preferred minimum periodicity for receiving reference time information messages from the wireless network; and
an indication of the UE's required time synchronization accuracy.

In some embodiments, the mobility-related message can be a handover request for the UE to the second cell. In some of these embodiments, the handover request can include a sixth indication of a clock source for the absolute reference times in the first reference time information messages transmitted by the first node. In such embodiments, the determining operations can include determining whether the second node is synchronized to the clock source indicated by the sixth indication. In such embodiments, these exemplary methods can also include, based on determining that the second node is not synchronized to the clock source indicated by the sixth indication, sending the first node a message indicating one of the following:

that the handover request is accepted; or
that the handover request is rejected together with a cause value indicating that the second node is not synchronized to the clock source indicated by the sixth indication.

In some embodiments, the message indicating that the handover request is accepted can include a reconfiguration message, for the UE, that instructs the UE to transmit a reference time preference message to the second node after completing the handover.

In some embodiments, these exemplary methods can also include sending, to the first node, a seventh indication that the second node is capable of providing reference time information messages.

In some embodiments, the second node comprises a centralized unit (CU) and a distributed unit (DU). In such embodiments, these exemplary methods can also include, based on determining that the second node can support reference time information delivery to the UE, performing one of the following operations by the CU:

initiating reference time information reporting by the DU to the CU;
adjusting a periodicity of ongoing reference time information reporting by the DU to the CU;
initiating broadcasting of reference time information messages by the DU; and
adjusting a periodicity of ongoing broadcasting of reference time information messages by the DU.

In some of these embodiments, at least a portion of the second reference time information messages are unicast messages formed by the CU based on reference time information reported by the DU.

In some embodiments, the first node can be a master node (MN) in dual connectivity (DC) towards the UE together with the second node as a secondary node (SN). In such embodiments, the mobility operation can be a MN change from the first node to a third node in the wireless network. In some of these embodiments, these exemplary methods can also include, before receiving the mobility-related message from the MN, transmitting one or more previous second reference time information messages to the UE. Each previous second reference time information message can include an absolute reference time and a corresponding reference event within DL transmissions by the SN.

In other of these embodiments, the second reference time information messages can be transmitted during the mobility operation (e.g., during the MN change). In such embodiments, these exemplary methods can also include, after completion of the mobility operation, sending to the third node (i.e., the new MN), a message comprising information associated with the second reference time information messages sent by the second node to the UE.

Other embodiments include various methods (e.g., procedures) for a first node (e.g., base station, eNB, gNB, etc., or components thereof) configured to serve a first cell in a wireless network (e.g., E-UTRAN, NG-RAN).

These exemplary methods can include sending a plurality of first reference time information messages to a UE. Each first reference time information message includes an absolute reference time and a corresponding reference event within DL transmissions by the first node in the first cell. These exemplary methods can also include initiating a mobility operation for the UE, whereby upon successful completion of the mobility operation, the UE no longer communicates with the first node via the first cell. These exemplary methods can also include sending, to a second node in the wireless network, a mobility-related message comprising information associated with the first reference time information messages sent by the first node.

In various embodiments, the information associated with the first reference time information messages can include any of the first through sixth indications described above in relation to second node embodiments.

In some embodiments, these exemplary methods can also include receiving, from the UE, a reference time preference message including one or more of the following:

the first indication of the UE's preference for receiving reference time information messages from the wireless network;
an indication of a preferred minimum periodicity for receiving reference time information messages from the wireless network; and
the fifth indication of the UE's required time synchronization accuracy.

In some embodiments, the periodicity indicated by the second indication is at least as frequent as the preferred minimum periodicity.

In some embodiments, the mobility operation can be a handover of the UE to a second cell served by the second node and the mobility-related message can be a handover request. In some of these embodiments, these exemplary methods can also include receiving, from the second node, a message indicating that the handover request is rejected. The message can also include a cause value indicating that the second node is not synchronized to a clock source for the absolute reference times in the first reference time information messages.

In other of these embodiments, these exemplary methods can also include receiving, from the second node, a message indicating that the handover request is accepted. The message can also include a reconfiguration message, for the UE, that instructs the UE to transmit a reference time preference message to the second node after completing the handover.

In some embodiments, these exemplary methods can also include receiving, from the second node, a seventh indication that the second node is capable of providing reference time information messages. In such embodiments, the initiating operations can include selecting the second cell (e.g., for handover) based on the seventh indication.

In other embodiments, the first node can be an MN in DC towards the UE together with the second node as an SN. In such embodiments, the mobility operation can be a MN change from the first node to a third node in the wireless network.

Other embodiments include network nodes (e.g., base stations, eNBs, gNBs, ng-eNBs, etc., or components thereof) configured to perform operations corresponding to any of the exemplary methods described herein. Other embodiments include non-transitory, computer-readable media storing program instructions that, when executed by processing circuitry, configure such network nodes to perform operations corresponding to any of the exemplary methods described herein.

These and other embodiments described herein can reduce the periodicity (i.e., increase the frequency) of reference time refreshes only in advance of an anticipated UE handover, which can reduce network processing and signaling overhead compared to continually sending more frequent refreshes independent of handover conditions.

Also, reducing the duration between a UE's last reference time information refresh in a source cell and the UE's initial reference time information refresh in a target cell can improve the accuracy of the UE's synchronization with 5GSC during and after handover to the target cell. Additionally, providing a handover target node with the time of the UE's last reference time information refresh in the source cell can facilitate accurate determination by the target node of when the UE needs a refresh of reference time information in the target cell to avoid synchronization with 5GSC deteriorating to an unacceptable level. This can benefit time-sensitive applications that rely on the UE remaining tightly synchronized with 5GSC.

These and other objects, features, and advantages of embodiments of the present disclosure will become apparent upon reading the following Detailed Description in view of the Drawings briefly summarized below.

BRIEF DESCRIPTION OF THE DRAWINGS

FIG. 6 illustrates an exemplary reference time update procedure between a UE and a serving network node (e.g., gNB).

FIG. 7 shows an ASN.1 data structure for an exemplary ReferenceTimeInfo information element (IE) used to provide the reference time to a UE.

FIG. 8 shows an ASN.1 data structure for a UEAssistanceInformation message by which a UE can indicate preference(s) for receiving 5G reference time information.

FIG. 9 shows a timing diagram that illustrates an exemplary scenario of interruption due to handover.

FIG. 11-12 are signaling diagrams that illustrate UE mobility operations involving a source gNB and a target gNB that includes a centralized unit (gNB-CU) and a distributed unit (gNB-DU), according to various exemplary embodiments of the present disclosure.

FIG. 14, which includes FIGS. 14A-B, shows a flow diagram illustrating an exemplary method (e.g., procedure) for a second node (e.g., base station, eNB, gNB, ng-eNB, etc.) in a wireless network (e.g., E-UTRAN, NG-RAN), according to various exemplary embodiments of the present disclosure.

FIGS. 20-23 are flow diagrams illustrating exemplary methods (e.g., procedures) implemented in a communication system, according to various exemplary embodiments of the present disclosure.

DETAILED DESCRIPTION

Figure 1:
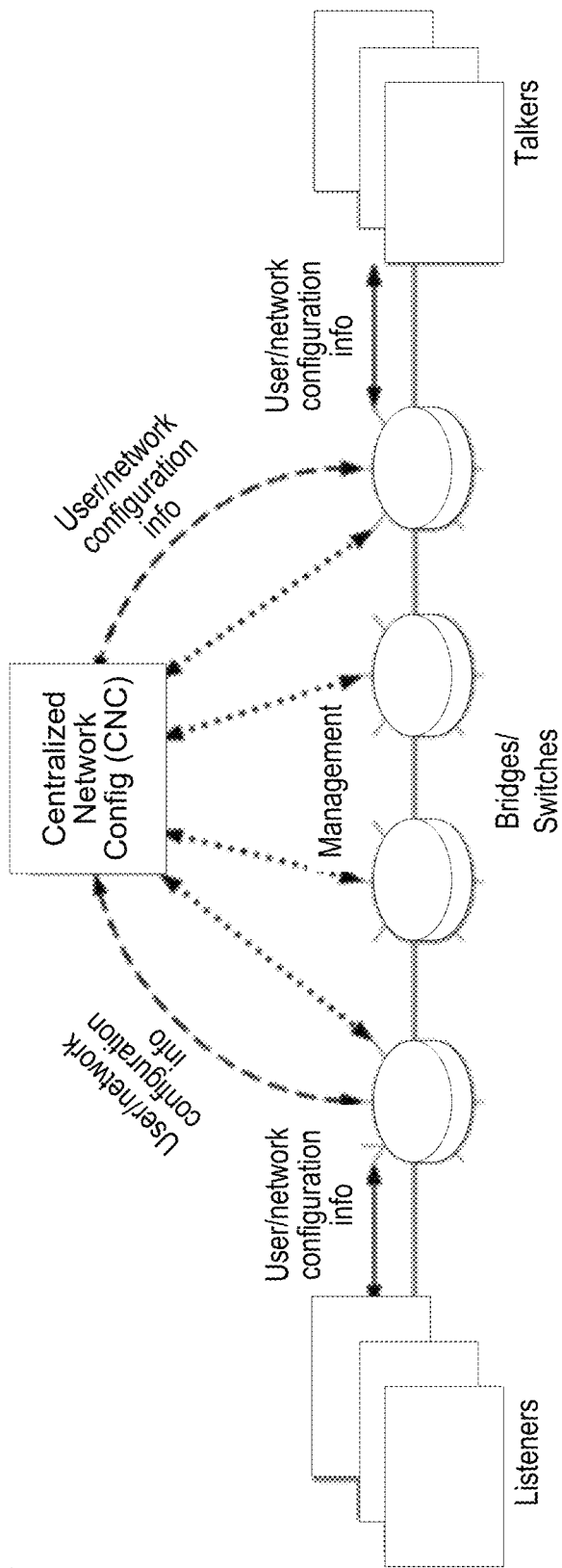
FIG. 1 is a block diagram illustrating a Centralized Time-Sensitive Networking (TSN) configuration model, as specified in IEEE 802.1Qbv-2015.
Figure 2:
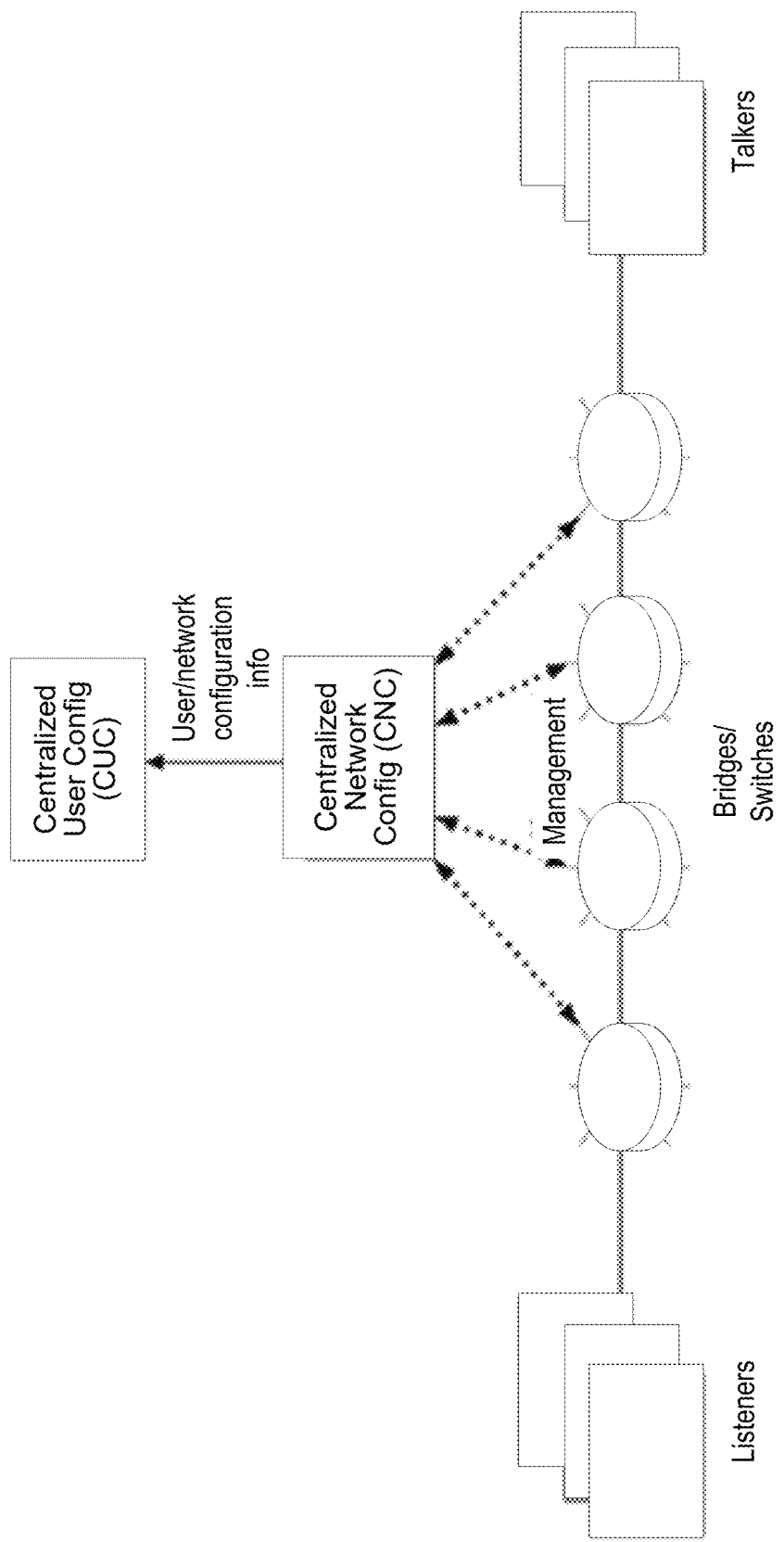
FIG. 2 is a block diagram illustrating a Fully Centralized TSN configuration model, as specified in IEEE 802.1Qbv-2015.
Figure 3:
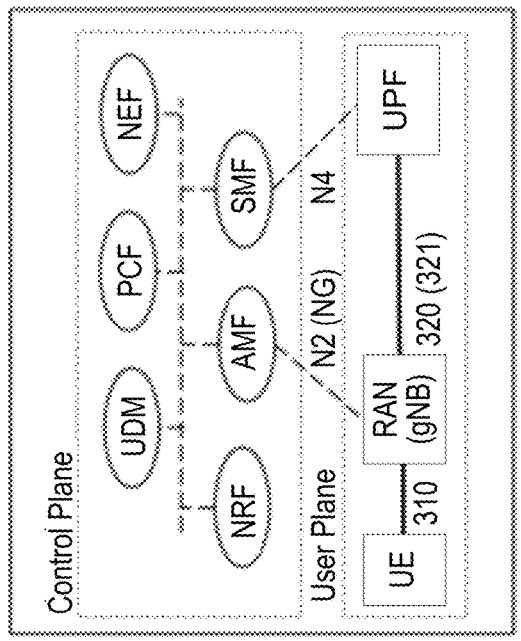
FIG. 3 is a block diagram illustrating an exemplary control plane (CP) and a data (or user) plane (UP) architecture of an exemplary 5G wireless network.
Figure 4:
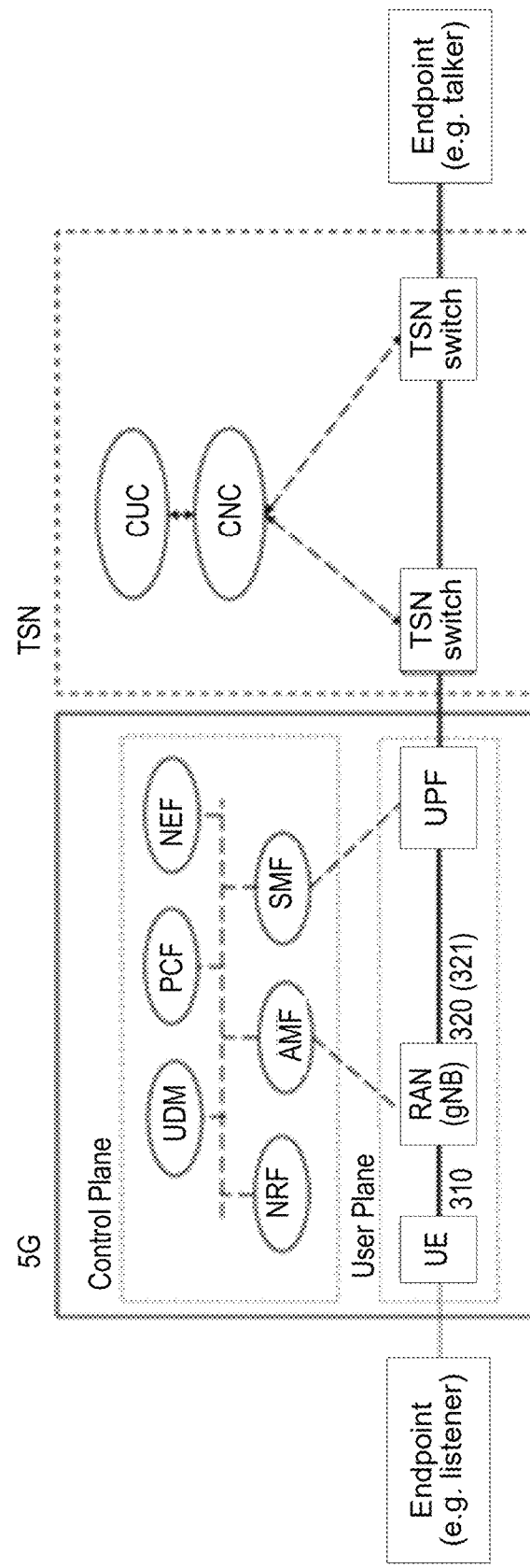
FIG. 4 is a block diagram illustrating an exemplary arrangement for interworking between the 5G network architecture shown in FIG. 3 and an exemplary fully centralized TSN network architecture.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein: rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc., are to be interpreted openly as referring to at least one instance of the element, apparatus, component, means, step, etc., unless explicitly stated otherwise. The steps of any methods and/or procedures disclosed herein do not have to be performed in the exact order disclosed, unless a step is explicitly described as following or preceding another step and/or where it is implicit that a step must follow or precede another step. Any feature of any of the embodiments disclosed herein can be applied to any other embodiment, wherever appropriate. Likewise, any advantage of any of the embodiments can apply to any other embodiments, and vice versa. Other objects, features, and advantages of the enclosed embodiments will be apparent from the following description.

Furthermore, the following terms are used throughout the description given below:

Radio Node: As used herein, a "radio node" can be either a "radio access node" or a "wireless device."

Radio Access Node: As used herein, a "radio access node" (or equivalently "radio network node," "radio access network node," or "RAN node") can be any node in a radio access network (RAN) of a cellular communications network that operates to wirelessly transmit and/or receive signals. Some examples of a radio access node include, but are not limited to, a base station (e.g., a New Radio (NR) base station (gNB) in a 3GPP Fifth Generation (5G) NR network or an enhanced or evolved Node B (eNB) in a 3GPP LTE network), base station distributed components (e.g., CU and DU), a high-power or macro base station, a low-power base station (e.g., micro, pico, femto, or home base station, or the like), an integrated access backhaul (IAB) node, a transmission point, a remote radio unit (RRU or RRH), and a relay node.

Core Network Node: As used herein, a "core network node" is any type of node in a core network. Some examples of a core network node include, e.g., a Mobility Management Entity (MME), a serving gateway (SGW), a PDN Gateway (P-GW), a Policy and Charging Rules Function (PCRF), an access and mobility management function (AMF), a session management function (SMF), a user plane function (UPF), a Charging Function (CHF), a Policy Control Function (PCF), an Authentication Server Function (AUSF), or the like.

Wireless Device: As used herein, a "wireless device" (or "WD" for short) is any type of device that has access to (i.e., is served by) a cellular communications network by communicate wirelessly with network nodes and/or other wireless devices. Communicating wirelessly can involve transmitting and/or receiving wireless signals using electromagnetic waves, radio waves, infrared waves, and/or other types of signals suitable for conveying information through air. Unless otherwise noted, the term "wireless device" is used interchangeably herein with "user equipment" (or "UE" for short). Some examples of a wireless device include, but are not limited to, smart phones, mobile phones, cell phones, voice over IP (VOIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IoT) devices, vehicle-mounted wireless terminal devices, etc.

Network Node: As used herein, a "network node" is any node that is either part of the radio access network (e.g., a radio access node or equivalent name discussed above) or of the core network (e.g., a core network node discussed above) of a cellular communications network. Functionally, a network node is equipment capable, configured, arranged, and/or operable to communicate directly or indirectly with a wireless device and/or with other network nodes or equipment in the cellular communications network, to enable and/or provide wireless access to the wireless device, and/or to perform other functions (e.g., administration) in the cellular communications network.

Note that the description given herein focuses on a 3GPP cellular communications system and, as such, 3GPP terminology or terminology similar to 3GPP terminology is oftentimes used. However, the concepts disclosed herein are not limited to a 3GPP system. Furthermore, although the term "cell" is used herein, it should be understood that (particularly with respect to 5G NR) beams may be used instead of cells and, as such, concepts described herein apply equally to both cells and beams.

As briefly mentioned above, during handover or other mobility operation, a UE's connection to a network source of reference time information might be lost temporarily. Even after a successful handover to a second node (e.g., gNB), there can be delays in the second node preparing reference time information for delivery to the UE. This can cause various problems, issues, and/or difficulties for time-sensitive applications that rely on the UE being closely synchronized to 5GSC This is discussed in more detail below after the following description of TSN and various aspects of 5G networks.

Figure 5:
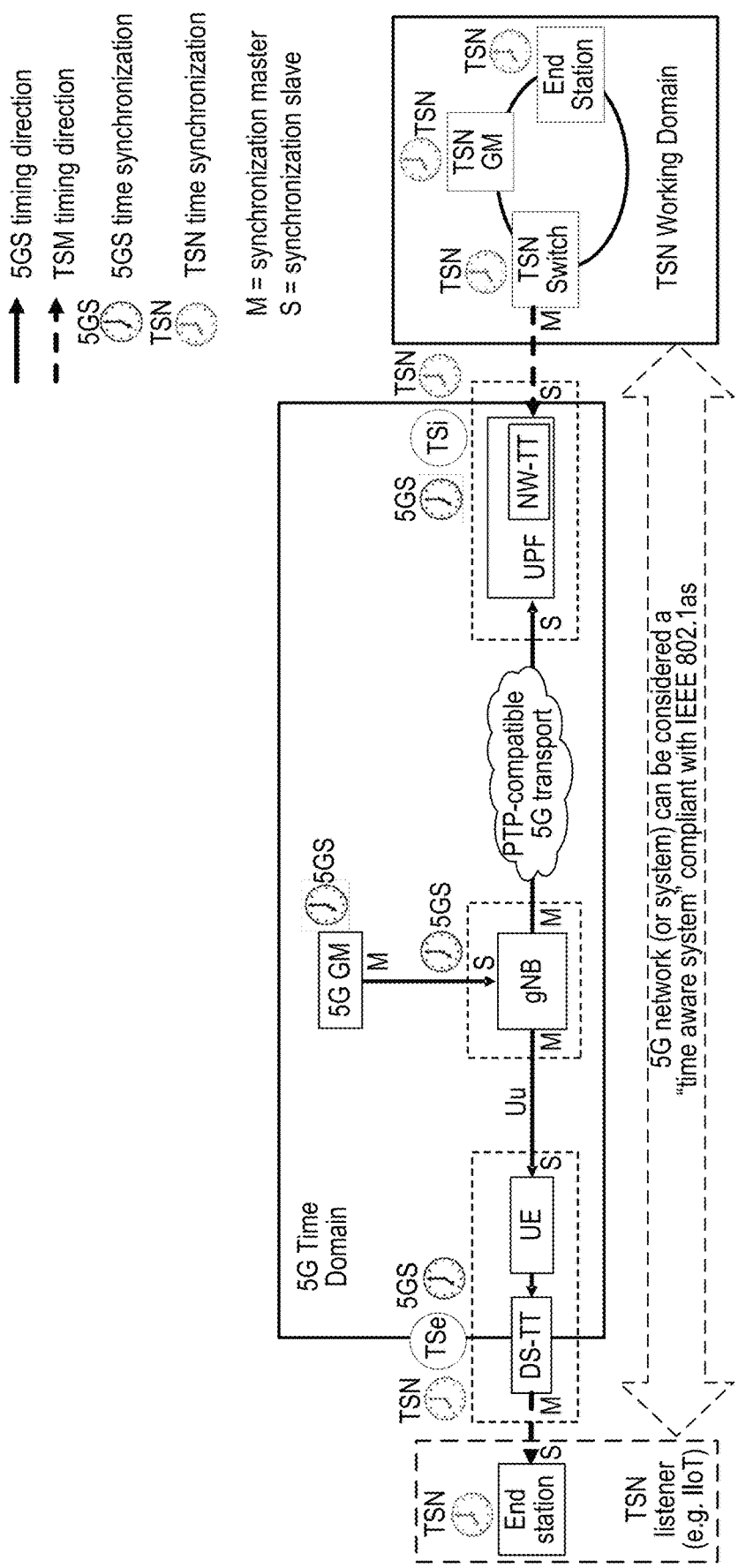
FIG. 5 is a high-level block diagram of an exemplary arrangement in which a 5G network delivers timing references from a time-sensitive network (TSN) to TSN end stations connected to the 5G network, according to various exemplary embodiments of the present disclosure.

FIG. 5 is a high-level block diagram of an exemplary arrangement in which a 5G network delivers timing references from a TSN to TSN end stations connected to the 5G network. The TSN source network is shown as a TSN Working Domain that includes a TSN GM, an end station, and a TSN Switch. In this exemplary arrangement, the 5G network is integrated with the external TSN network as a TSN bridge, such as shown in other figures described above. Furthermore, in this arrangement, the 5G network can be modelled as an IEEE 802.1AS compliant entity: for TSN synchronization, the end-to-end 5G network can be considered an IEEE 802.1AS "time-aware system".

However, only the TSN Translators (TTs) at the edges of the 5G network need to support the IEEE 802.1AS operations. This includes a network side TSN translator (NW-TT) at the user plane function (UPF) and a device-side TSN translator (DS-TT) at the UE. Ingress timestamping ("TSi") is performed by the NW-TT when an external TSN clock (e.g., timing) signal is received by from the TSN Working Domain. Likewise, egress timestamping ("TSe") is performed by the DS-TT when that TSN clock signal arrives at a UE. In addition to ingress and egress timestamping, the TTs can support other 802.1AS functions such as generalized precision time protocol (gPTP), Best Master Clock Algorithm (BMCA), rateRatio, etc.

More specifically, upon reception of a downlink gPTP message, the NW-TT makes an ingress timestamp (TSi) for each gPTP event (Sync) message. The UPF then forwards the gPTP message from TSN network to the UEs via all UPF-terminated PDU sessions that the UEs have established to the TSN network. All gPTP messages are transmitted on a quality of service (Qos) flow that complies with the residence time upper bound requirement specified in IEEE 802.1AS. The UE receives the gPTP messages and forwards them to the DS-TT. The DS-TT then makes an egress timestamp (TSe) for the gPTP event (Sync) messages for the TSN domain (e.g., the endpoints).

The difference between TSi and TSe reflects the residence time of the gPTP message within the 5G network, expressed in 5GSC time. Put differently, if gPTP message indicating TSN time "X" is stamped with 5G system clock (5GSC) time "Y" at ingress and 5GSC time "Z" at egress, the end stations can adjust TSN time "X" delivered to the end station by the residence time Z-Y. More specifically, the DS-TT calculates and adds the measured residence time between the TTs into the Correction Field (CF) of each gPTP event (Sync) message. As such, the relative accuracy of the 5G residence time measured between ingress and egress is essential for accurate TSN GM clock timing information delivered over 5G networks.

In the 5G network, the UE, the gNB, the UPF, the NW-TT, and the DS-TT are synchronized with a grandmaster 5GSC ("5G GM" in FIG. 5), either directly or indirectly. In general, the 5GSC is made available to all UP nodes in the 5G network via a PTP-compatible transport network. Likewise, 5GSC is made available to UEs via signaling of absolute timing of radio frames. In FIG. 5, solid lines are used to denote flow of 5GSC synchronization between respective synchronization master ("M") and slave ("S") elements in the 5G network. Likewise, dashed lines are used to denote flow of TSN GM synchronization between respective synchronization master ("M") and slave ("S") elements in the TSN domain. In general, the two synchronization processes can be independent from each other and the gNB only needs to be synchronized to the 5GSC.

To summarize, the time synchronization solution defined in 3GPP TS 23.501 (v16.4.0) only requires NG-RAN nodes (e.g., gNBs) to be synchronized to the 5G network reference time (i.e., based on 5GSC) while TSN GM timing is delivered to UEs and endpoints transparently through the 5G network using gPTP signaling. For 5GSC synchronization, a UE relies on its serving gNB providing reference time periodically, either via broadcast or unicast signaling. For example, reference time information can be delivered via broadcast in SI block SIB9 or via unicast via the RRC message DLInformationTransfer. To support time sensitive communications, a reference time granularity of 10 ns is defined in 3GPP TS 23.501.

The radio resource control (RRC) layer of the control plane (CP) controls UE mobility between cells in the NG-RAN as well as between NG-RAN and previous generation Evolved UTRAN (E-UTRAN). After a UE is powered on it will be in the RRC_IDLE state until an RRC connection is established with the network, at which time the UE will transition to RRC_CONNECTED state (e.g., where data transfer can occur). The UE returns to RRC_IDLE after the connection with the network is released. In RRC_IDLE state, the UE does not belong to any cell, no RRC context has been established for the UE (e.g., in NG-RAN), and the UE is out of uplink (UL) synchronization with the network. Even so, a UE in RRC_IDLE state is known in the core network (e.g., 5GC) and has an assigned IP address.

Furthermore, in RRC_IDLE state, the UE's radio is active on a discontinuous reception (DRX) schedule configured by upper layers. During DRX active periods (also referred to as "On durations"), an RRC_IDLE UE receives system information (SI) broadcast by a serving cell, performs measurements of neighbor cells to support cell reselection, and monitors a paging channel for pages from the core network via a RAN node (e.g., gNB) serving the cell in which the UE is camping. A UE must perform a random-access procedure to move from RRC_IDLE to RRC_CONNECTED state. In RRC_CONNECTED, the cell serving the UE is known and an RRC context is established for the UE in the serving RAN node, such that the UE and the RAN node can communicate.

The NR RRC layer also includes an RRC_INACTIVE state in addition to RRC_IDLE and RRC_CONNECTED. The UE's RRC connection can be suspended to RRC_INACTIVE and then later resumed (i.e., to RRC_CONNECTED state). The suspended UE's RRC context is stored by the NG-RAN, which can page the UE while in RRC_INACTIVE.

A common mobility procedure for UEs in RRC_CONNECTED state (e.g., with an active connection) is handover (HO) between cells. A UE is handed over from a source or serving cell, provided by a source node, to a target cell provided by a target node. Seamless handovers are a key feature of 3GPP technologies. Successful handovers ensure that the UE moves around in the coverage area of different cells without causing too many interruptions in data transmission. However, handover can have various problems related to robustness.

FIG. 6 illustrates an exemplary reference time update procedure between a UE and a serving gNB. In SFNx, the gNB transmits a reference time message (e.g., SIB9 or unicast) with a 5G reference time value ($t_R$) and a corresponding reference event on the radio interface for the cell. In the example shown in FIG. 6, the reference event is the end of SFNz that is subsequent to SFNx. For SIB9, the value of $SFN_z$ is implicitly indicated as the SFN boundary at or immediately after the ending boundary of the SI-window in which SIB9 is transmitted. When the reference time is sent in a unicast message, the reference cell of the time at the ending boundary of the SFN indicated by the referenceSFN field is the UE's PCell. The UE receives the reference time message in advance of the reference event and subsequently synchronizes its internal clock with the reference time $t_R$ that occurs at the end of SFNZ.

NG-RAN nodes, such as gNBs, can include a central (or centralized) unit (CU or gNB-CU) and one or more distributed (or decentralized) units (DU or gNB-DU). CUs are logical nodes that host higher-layer protocols and perform various gNB functions such controlling the operation of DUs. Each DU is a logical node that hosts lower-layer protocols and can include, depending on the functional split, various subsets of the gNB functions. In the context of providing reference time to UEs, the SIB and RRC unicast messages are generated by a CU and, preferably, the reference event is referenced on the radio interface provided by the DU. Thus, a DU can overwrite SIB9 for broadcast delivery. For unicast delivery, a DU reports 5GSC time at reference event (e.g., SFN) to CU, which generates the unicast RRC message that includes the reported timing relationship.

FIG. 7 shows an ASN.1 data structure for an exemplary ReferenceTimeInfo information element (IE) used to provide the reference time to a UE. The IE includes a time field that is defined as a ReferenceTime structure that includes fields for days, seconds, milliseconds (ms), and tens of nanoseconds (ns). The IE also includes a referenceSFN that defines the reference event on the radio interface. In addition, the uncertainty field reflects a level of uncertainty in the provided timing relationship. This includes two factors: 1)

the accuracy with which a gNB implementation can ensure that the indicated reference time corresponding to reference point will reflect the actual time when that reference point occurs at the antenna reference point, and 2) the accuracy with which the 5G reference time is acquired by the gNB. The actual uncertainty is 25 ns multiplied by the integer value in this field. If this field is absent, the uncertainty is unspecified.

If the timeInfoType is not included in the IE, the time field indicates the GPS time and the origin of the time field is 00:00:00 on Gregorian calendar date 6 Jan. 1980 (i.e., start of GPS time). If timeInfoType is set to localClock, the origin of the time is unspecified.

In addition, to support time-sensitive communications in Rel-16, the UE Assistance Information procedure has been extended to allow a UE to indicate its preference(s) for receiving 5G reference time information. FIG. 8 shows an ASN.1 data structure for a UEAssistanceInformation message by which a UE can indicate these preferences. In particular, the reference TimeInfoPreference IE is a Boolean value that indicates when the UE's preference for reference time information has changed, i.e., from true to false or from false to true. The UE cannot send another indication with the same value. Once UE send the preference request. UE relies on periodic gNB broadcast/unicast to refresh its reference time and should no longer re-send the request to the network.

One problem that arises in determining these timing relationships is the radio frequency (RF) propagation delay (PD) of the signal from the gNB to the UE, which is proportional to the distance between gNB and UE. For example, a UE that is 300 m distant from the gNB antenna will experience a propagation delay of approximately one microsecond. As such, even if the gNB provides the UE with a 5GSC time, the TSN time derived by the UE may be inaccurate (e.g., offset) by the amount of the PD. Put differently, a TSN-5GSC timing relationship is only accurate up to the point of transmission of the TSN message by the gNB, e.g., at the gNB's transmission antenna(s). Furthermore, UEs may experience PDs that vary with time as the distance to the serving gNB changes and/or the serving gNB changes. Likewise, different UEs served by the same gNB may experience different PDs.

Since the most stringent end-to-end synchronization requirement for time-sensitive applications is also one microsecond, the propagation delay from the gNB to the UE must be considered. The 3GPP Timing Advance command (see 3GPP TS 38.133) is used for UE uplink (UL) transmission synchronization. This may be needed due to changes in the UE propagation environment and/or distance between the UE and the serving base station (e.g., gNB). At connection setup, an absolute timing correction is communicated to a UE using a medium access control (MAC) random access response (RAR) element. After connection setup, a relative timing correction can be sent to a UE using a MAC control element (CE).

The downlink (DL) propagation delay (PD) can be estimated for a given UE by (a) summing the TA value indicated by the initial absolute TA value and all subsequent relative TA values, and (b) taking some portion of the resulting total TA value to represent DL-only delays. For example, 50% could be used assuming the downlink and uplink propagation delays are essentially the same. The estimated PD can then be used to understand time synchronization dynamics, e.g., for accurately tracking and/or compensating the value of a 5GSC at the UE side relative to the value of that clock in some other network node.

A dual connectivity (DC) framework was introduced in Long Term Evolution (LTE) Rel-12. Dual connectivity refers to a mode of operation in which a UE, in RRC_CONNECTED state, consumes radio resources provided by at least two different network points connected to one another with a non-ideal backhaul. In LTE, these two network points may be referred to as a "Master eNB" (MeNB) and a "Secondary eNB" (SeNB). More generally, master node (MN), anchor node, and MeNB can be used interchangeably, and the terms secondary node (SN), booster node, and SeNB can be used interchangeably. DC can be viewed as a special case of carrier aggregation (CA), where the aggregated carriers (or cells) are provided by network nodes that are physically separated and not connected via a robust, high-capacity connection.

In LTE DC, a UE is configured with a Master Cell Group (MCG) associated with the MeNB and a Secondary Cell Group (SCG) associated with the SeNB. Each of the CGs is a group of serving cells that includes one MAC entity, a set of logical channels with associated RLC entities, a primary cell (PCell), and optionally one or more secondary cells (SCells). The term "Special Cell" (or "SpCell" for short) refers to the PCell of the MCG or the PSCell of the SCG depending on whether the UE's MAC entity is associated with the MCG or the SCG, respectively. In non-DC operation (e.g., CA). SpCell refers to the PCell. An SpCell is always activated and supports physical uplink control channel (PUCCH) transmission and contention-based random access by UEs.

The MeNB provides system information (SI) and terminates the control plane connection towards the UE and, as such, is the controlling node of the UE, including handovers to and from SeNBs. For example, the MeNB terminates the connection between the eNB and the Mobility Management Entity (MME) for the UE. An SeNB provides additional radio resources (e.g., bearers) for radio resource bearers include MCG bearers. SCG bearers, and split bearers that have resources from both MCG and SCG. Data radio bearers (DRBs) carry user plane data while signaling radio bearers (SRBs) carry control plane information (e.g., RRC and NAS messages).

The reconfiguration, addition and removal of SCells can be performed by RRC. When adding a new SCell, dedicated RRC signaling is used to send the UE all required SI of the SCell, such that UEs need not acquire SI directly from the SCell broadcast. It is also possible to support CA in either or both of MCG and SCG. In other words, either or both of the MCG and the SCG can include multiple cells working in CA.

DC is also envisioned as an important feature for 5G networks. Several DC (or more generally, multi-connectivity) scenarios have been considered for NR. These include NR-DC that is similar to LTE-DC discussed above, except that both the MN and SN (e.g., gNBs) employ the NR radio interface to communicate with the UE. In addition, various multi-RAT DC (MR-DC) scenarios have been considered, whereby a compatible UE can be configured to utilize resources provided by two different nodes, one providing E-UTRA/LTE access and the other one providing NR access. One node acts as the MN (e.g., providing MCG) and the other as the SN (e.g., providing SCG), with the MN and SN being connected via a network interface and at least the MN being connected to a core network (e.g., EPC or 5GC).

In MR-DC, a SN is not required to broadcast system information (SI) other than for radio frame timing and system frame number (SFN). The UE's MN provides SI for initial configuration by dedicated RRC signaling to the UE.

The UE acquires SN radio frame timing and SFN of the SCG from the PSCell, i.e., PSS/SSS and MIB if the SN is an eNB or PSS/SSS and PBCH if the SN is a gNB.

All MR-DC arrangements support split SRB1 and split SRB2 but do not support split SRB0 and split SRB3. Split SRBs can be configured by the MN via an SN Addition or SN Modification procedures, with SN configuration part provided by the SN. A UE can be configured with both SRB3 and a split SRB simultaneously, e.g., SRB3 and the SCG leg of split SRB can be independently configured. For the split SRB, the selection of DL transmission path depends on network implementation. For UL, the UE is configured via MN RRC signaling whether to use MCG path or duplicate the transmission on both MCG and SCG.

When CA is deployed, frame timing and SFN are aligned across cells that can be aggregated, or a timing offset between the PCell/PSCell and an SCell (e.g., number of slot) is configured for the UE. In CA, a UE may simultaneously receive or transmit on one or multiple CCs depending on its TA capabilities. A UE with only single TA capability for CA can simultaneously receive and/or transmit on multiple CCs corresponding to multiple serving cells that share the same TA (i.e., grouped in one TAG). A UE with multiple TA capability for CA can simultaneously receive and/or transmit on multiple CCs corresponding to multiple serving cells with different TAs (i.e., multiple serving cells grouped in multiple TAGs). The NG-RAN ensures that each TAG contains at least one serving cell. Finally, a non-CA capable UE can receive on a single CC and transmit on a single CC corresponding to one serving cell only, i.e., one serving cell in one TAG.

As discussed above, for 5GSC synchronization, a UE relies on its serving gNB to deliver (or "refresh") reference time periodically, either via broadcast or unicast signaling. The nominal periodicity $T_n$ of gNB reference time delivery is left to network implementation. However, $T_n$ can reflect the UE clock stability and gNB clock stability in relation to the 5G GM clock used as the basis of the 5G reference time, etc. Due to various reasons, the UE's connection to the serving gNB might be lost temporarily, causing the UE to miss refreshes of reference time information. This can be detrimental for time-sensitive applications that rely on the UE to maintain close time synchronization with the 5GSC.

One example of this scenario is during handover, when a UE transitions from a source cell served by one network node to a target cell served by the same, or a different, network node. It is possible that the UE may miss one or more refreshes of reference time information during handover, particular if the periodicity of these refreshes is very frequent relative to the duration of the handover. In some cases, handover to an initial target cell may fail, causing the UE to try additional target cells and/or to return to idle mode and establish a new connection with the network. This interruption can cause the UE to miss multiple reference time updates. Furthermore, even after a successful handover to a target cell served by a different network node, there can be delays in the new serving node preparing reference time information for delivery to the UE.

The duration of interruption during handover should be considered when determining the periodicity of the network's transmission of reference time information to the UE. FIG. 9 shows a timing diagram that illustrates an exemplary scenario of interruption due to handover. In this scenario, the network updates the reference time information with a nominal periodicity of t1 (i.e., Tn=t1), which is interrupted for duration t2 during handover. Due to the interruption, the worst-case delay between two reference time deliveries is t1+t2, which is greater than $T_n$ for t2>0 (i.e., a non-zero duration of the interruption). To mitigate the impact of the interruption time, the refresh periodicity t1 should be reduced (i.e., more frequent) to reduce the time between the last refresh before handover (i.e., in the source cell) and the first refresh after handover (i.e., in the target cell). This can improve the accuracy of the UE's synchronization with 5GSC during and after handover to the target cell, at least until the UE receives the first refresh in the target cell.

Embodiments of the present disclosure address these and other needs, problems, and/or difficulties by techniques for maintaining a continuity of delivery of reference time information during UE handover. In various embodiments, this can be accomplished by facilitating a faster indication to the target cell that a UE needs reference time delivery, and/or by simultaneously transmitting reference time information from two cell groups, thus reducing the interruption time to be zero.

Embodiments can provide various benefits, advantages, and/or solutions to problems described herein. For example, embodiments can reduce the periodicity (i.e., increase the frequency) of reference time refreshes only in advance of an anticipated UE handover, which can reduce network processing and signaling overhead compared to continually sending more frequent refreshes independent of handover conditions.

Reducing the duration between a UE's last reference time information refresh in a source cell and the UE's first reference time information refresh in a target cell can improve the accuracy of the UE's synchronization with 5GSC during and after handover to the target cell. Providing a handover target node with the time of the UE's last reference time information refresh in the source cell can facilitate accurate determination by the target node of when the UE needs a refresh of reference time information in the target cell to avoid synchronization with 5GSC deteriorating to an unacceptable level. This can benefit time-sensitive applications that rely on the UE remaining tightly synchronized with 5GSC.

In general, gNBs in the NG-RAN can communicate with each other via an Xn interface. 3GPP specifications also define various procedures between nodes over the Xn interface, including an Xn handover procedure to support handover of a UE from a source cell served by source gNB to a target cell served by a (different) target gNB.

In some embodiments, during an Xn handover procedure, the source gNB can deliver to the target gNB information about whether the UE to be handed over needs reference time information to be provided by the target gNB. For example, the source gNB can deliver the latest value of referenceTimeInfoPreference provided by the UE in a UEAssistanceInformation message. Alternately, gNB the e source can deliver latest value of referenceTimeInfoPreference only if its Boolean value is "true," with the absence of this information indicating to the target gNB that the UE does not need to be provisioned with the reference time information. The benefit of the source gNB sending such information when requesting the handover, rather than relying on the UE to request after the connection is established in the target gNB, is to allow the target gNB prepare the reference time information for the UE in advance, thereby reducing the duration between two consecutive refreshes of reference time information for the UEs.

Figure 10:
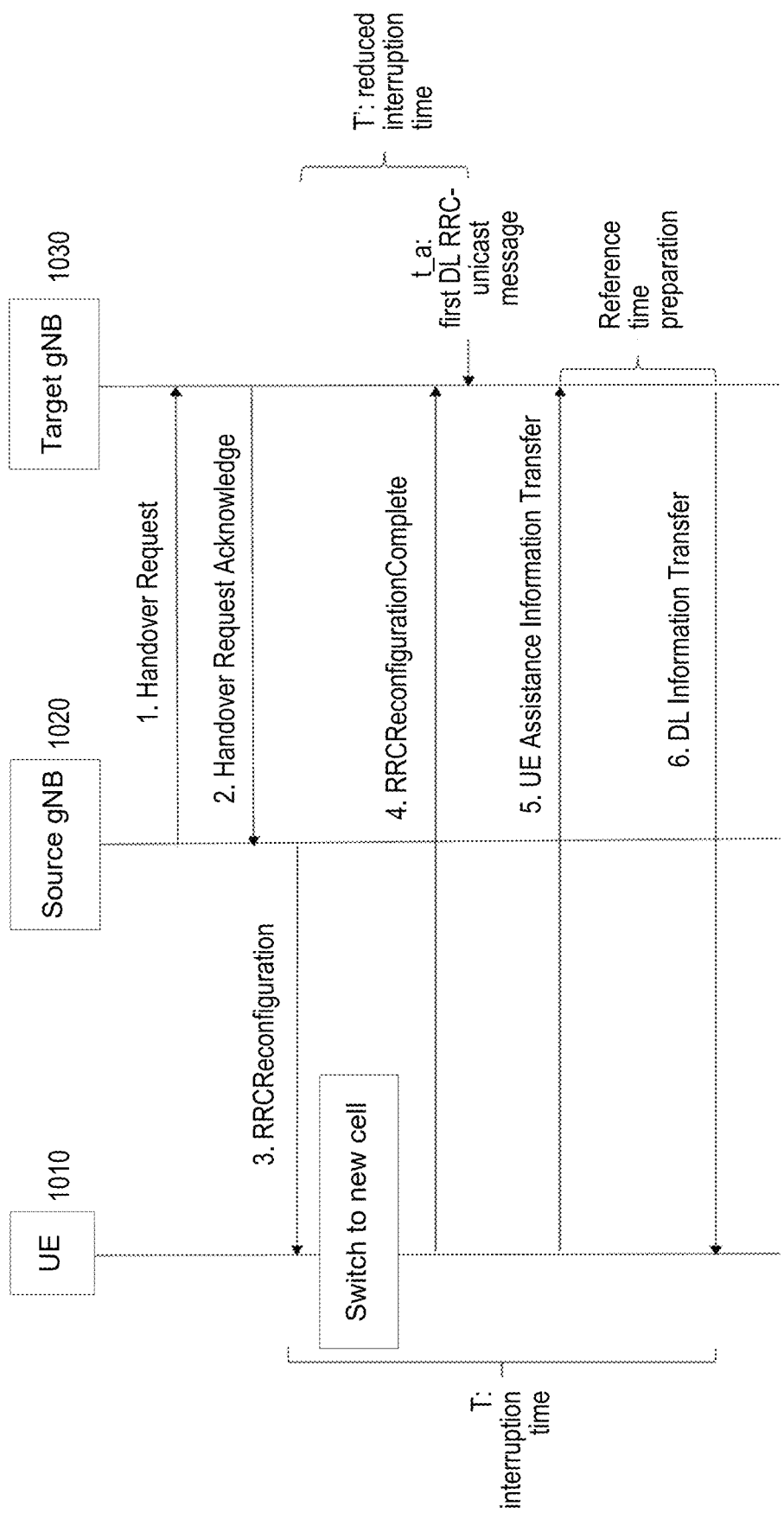
FIG. 10 is a signaling diagram that illustrates an exemplary handover of a UE, according to various exemplary embodiments of the present disclosure.

FIG. 10 is a signaling diagram that illustrates an exemplary handover of a UE according to these embodiments. Although some of the operations shown in FIG. 10 are given numerical labels, this is intended to facilitate explanation rather than to require or imply an execution order of the operations.

In operation 1, after determining (e.g., based on a UE measurement report) that the UE should be handed over from a source cell served by the source gNB to a target cell served by the target gNB, the source gNB sends the target gNB a Handover Request message pertaining to the handover. In operation 2, the target gNB responds with a Handover Request Acknowledge message, which includes an embedded RRCReconfiguration message for the UE that contains configuration information for the target cell. In operation 3, the source gNB sends the RRCReconfiguration message to the UE, which triggers handover to the target cell upon receipt. After completing handover, in operation 4, the UE sends an RRCReconfigurationComplete message to the target gNB. Subsequently, in operation 5, the UE sends a UEAssistanceInformation message indicating the UE's preference for receiving reference time information from the target gNB. In operation 6, the target gNB transmits a DLInformationTransfer message containing reference time information as requested by the UE.

Conventionally, the interruption time, T, is the duration between operation 3 (when the source gNB transmits the RRCReconfiguration message triggering handover) and operation 6 (when the target gNB transmits the DLInformationTransfer message). This interruption time is without any UE preference information exchange between source gNB and target gNB.

In contrast, if the source gNB sends the target gNB the latest value of referenceTimeInfoPreference provided by the UE in the Handover Request message of operation 1, the target gNB can begin preparing a reference time refresh for the UE while the UE connection with the target cell is being established. Subsequently, after operation 4, the target gNB is able to send the UE (at t_a shown in FIG. 10) a DL unicast message (e.g., DLInformationTransfer) containing reference time information prepared in advance based on the information received from the source gNB. In this case, the interruption time has been reduced to T'<T.

In some embodiments, the UE can also provide the target gNB with various other reference time-related information the UEAssistanceInformation message sent in operation 4. Such information can include a preferred minimum periodicity (i.e., lowest acceptable frequency) for reference time information delivery, the UE's clock stratum level (e.g., desired/required accuracy), etc.

In some embodiments, the source gNB can also provide the target gNB (e.g., in the Handover Request message) various information related to the source gNB's reference time delivery parameters. Some examples are discussed below:

Uncertainty indication. A large uncertainty value indicates that the reference time information provided by the source gNB has coarse granularity and/or accuracy, which the target gNB can use to determine requirements on its reference time information delivery. In other words, if the target gNB supports reference time delivery with an uncertainty that is better than indicated by the source gNB, one can expect that the UE's synchronization with 5GSC will not deteriorate significantly across handover related interruptions. For example, if the source gNB indicates an uncertainty of 32767, then the accuracy of the delivered reference time is 32767*25 ns or ~0.8 ms. In such case, the target gNB can transmit the reference time with a granularity and/or accuracy on the order of 0.1 ms.

Local clock. This can facilitate synchronization of the target gNB and the source gNB. If no information is indicated, then GPS time can be assumed. If a source gNB local clock is indicated, then the target gNB shall also transmit this local clock via a transparent container that includes the origin and current (or original) value of the local clock. In this manner, the relationship between local locks can be maintained.

Furthermore, beside the above-mentioned information from source gNB to target gNB, the source gNB can also include information on the time (e.g., of 5GSC) when the last referent time refresh was provided by the source gNB to the UE. When used together with the UE's clock stratum level (which indicates a desired/required UE synchronization accuracy), this last refresh time can be used by the target gNB to determine the latest point in time for the next reference time refresh ("latest next refresh time") to the UE. In other embodiments, the source gNB can determine and send this latest next refresh time to the target gNB.

The source gNB can send the above-mentioned information over the Xn interface, particular over XnAP if CP signaling is used or over XnUP if UP protocol is impacted. Upon receiving any of the above-mentioned information from the source gNB, the target gNB prepares for providing the next reference time refresh (or update) to the UE. In case of the split CU-DU architecture, this can include the gNB-CU requesting time reference reporting from a gNB-DU serving the target cell, or adjusting an existing time reference reporting period in the target cell to accommodate the UE. If the periodicity is sent by the source gNB, the target gNB can use this information in either of these operations. Once the refreshed reference time information has been prepared, the target gNB then sends it to the UE at the first possible RRC unicast message, e.g., in DLInformationTransfer.

FIG. 11 shows a signal flow diagram that illustrates these embodiments. In particular, FIG. 11 shows operations by, and signaling between, a source gNB and a target gNB that comprises a gNB-CU and a gNB-DU. Initially, the source gNB sends an XnAP: RRCTransfer message that includes any of the reference time related information provided by the UE (e.g., in UEAssistanceInformation) or configured/delivered by the source gNB, as discussed above. Subsequently, the target gNB-CU performs operations toward the target gNB-DU serving the target cell for the UE handover. This can include sending/receiving messages over the F1AP interface between the CU and the DU. After communicating with the target gNB-DU in this manner, the target gNB-CU can prepare with reference time information to be sent to the UE after handover is completed.

FIG. 12 shows a signal flow diagram that illustrates an alternative embodiment involving the source gNB, target gNB-CU, and target gNB-DU. This embodiment differs from the one shown in FIG. 11, in that after receiving the information from the source gNB, the DU prepares/triggers broadcasting of SIB9 with the reference time information in the target cell, if SIB9 is not already being broadcast. The DU also sends an F1AP message to the DU to initiate SIB9 broadcasting by the DU.

In other embodiments, the handover procedure between the source gNB and the target gNB can take place via the gNBs' respective NG interfaces to the 5GC. This can occur, for example, if there is no Xn interface established between the source and target gNBs. During the NG handover procedure, the source gNB delivers to the target gNB any of the above-described information in a source to target transparent container. Subsequently, the target gNB can prepare for and execute reference time refresh for the UE in the same manner as described above.

In general, all gNBs in the NG-RAN—including the source and target gNBs for the UE handover—should be synchronized to the same 5G GM clock (e.g., in FIG. 5), which is ultimately derived from the GPS master clock. On the other hand, a target gNB synchronized to 5G GM can assume that the source gNB is also synchronized to 5G GM if the timeInfoType field of ReferenceTimeInfo IE shown in FIG. 7 is not present. In some scenarios, however, the source and target gNBs are not fully synchronized since their respective 5G reference times are not derived from the same 5G GM clock.

In some cases, the source and/or target gNBs may be synchronized to respective local clocks, which is indicated in the respective timeInfoType fields. If the source gNB transmits a localClock to UE while the target gNB does not (or vice versa), then the two gNBs are not synchronized and thus the target gNB (or source gNB) does not support TSN clock delivery. However, if both source and target gNBs support localClock, then the origin of their local clocks needs to be the same otherwise they cannot be considered synchronized. In such case, the target gNB may be considered as non-TSN compatible from the source gNB's perspective.

In some embodiments, all gNBs in a non-public network (NPN) can be synchronized to the same GM clock, and UEs operating in the NPN should be handed over to these gNB in the NPN with the highest priority. The following describes various embodiments that can be used in scenarios that do not involve an NPN:

1) During the Xn Setup procedure between two gNBs (referred to as serving and neighbor), the serving and neighbor gNBs can indicate to each other whether each is part of a 5G system that supports TSN whereby 5GSC reference time can be delivered to UEs. If the neighbor gNB does not support TSN, the serving gNB can decide to exclude cells served by this neighbor gNB as target cells for handover of UEs requiring TSN functionality.
2) In response to a Handover Request that indicates need for TSN functionality for the UE (as discussed above), the target gNB can reject the Handover Request with an explicit cause value that indicates the clock at the target gNB is not synchronized to that at the source gNB.
3) In some cases, the target gNB supports TSN functionality but supports a different reference time than the source gNB. This can occur, for example, if the target and source gNBs are connected to different UPFs that utilize different 5G GM clocks. In these cases, the target gNB can accept the Handover Request but after handover is complete, the target gNB sends the UE a reference time refresh that is based on the 5G GM clock used by the target gNB and the new UPF. This allows the 5G reference times used at the source and target gNB to be unsynchronized and still allows for continuity of TSN type service across handover. This is because supporting TSN type service requires the same 5G reference time be made available at the 5G ingress and egress points applicable to transparently relaying a TSN GM clock through the 5GS.
4) Alternately, a target gNB that does not support TSN can accept the handover of a UE that requires reference time information. This can occur, for example, if the UE moves from the coverage range of a gNB that is synchronized to 5GSC to a gNB that is not. Even so, the UE is still able to establish an RRC connection with the target gNB and maintain data service. After the handover, the UE can indicate to its the upper layer that reference time delivery is not available in the target cell (e.g., TSN GM clock-based services are not supported).

As mentioned above, if the target gNB is unable or unwilling to provide reference time information to UEs, it may decline a handover request for a UE requiring such information. In some embodiments, if the target gNB is temporarily unavailable for reference time delivery (e.g., in upcoming reference time update periods), it may delay acceptance of the handover request, which would cause the source gNB to continue to provide refreshes of reference time information to the UE. For example, the target gNB can provide a handover command (i.e., RRCReconfiguration message) to the source gNB for delayed delivery to the UE, until which the source gNB continues to provide refreshes of reference time information to the UE. This delay can give the target gNB some time to acquire and prepare reference information for delivery to the UE after handover is complete.

In some cases, the target gNB does not support reference time delivery or the UE's preference for reference time information is not indicated to the target gNB (e.g., by the source gNB). In some embodiments, this triggers UE to transmit the UEAssistanceInformation message. For example, the UE can be configured with referenceTimePreferenceReporting in the OtherConfig IE included in the RRCReconfiguration message sent by the target gNB via the source gNB. If so, then the UE initiate transmission of the UEAssistanceInformation message after handover is complete. This is different from the other triggering mechanisms for reference time preference reporting, which include a), UE first configured to report: b) UE has changed the preference from true to false or false to true. This is exemplified by the following procedural text, in which underline indicates changes from 3GPP TS 38.331 v16.1.0.

*Begin Exemplary Text for 3GPP TS 38.331*

2> if reconfigurationWithSync was included in masterCellGroup or secondaryCellGroup; and
2> if the UE transmitted a UEAssistanceInformation message for the corresponding cell group during the last 1 second, and the UE is still configured to provide UE assistance information for the corresponding cell group: or
2> if the UE is still configured with referenceTimePreferenceReporting to provide preference in being provisioned with reference time information:
3> initiate transmission of a UEAssistanceInformation message in accordance with section 5.7.4.3:

*End Exemplary Text for 3GPP TS 38.331*

Although embodiments have been described above in the context of a handover from a source gNB to a target gNB, embodiments are equally applicable to an inter-RAT or inter-system handover between a source gNB (or eNB) and a target eNB (or gNB). Although the TSN functionality is only supported in 5G networks, starting from Rel-15, LTE eNB's support reference time delivery, with reference time being defined in a similar manner as for 5G and GPS being the default 5G GM clock along with the ability to indicate that the clock can be local. In other words, eNBs and gNBs can be synchronized to the same 5G reference time by default. During handover of a UE needing reference time refreshes, a target eNB can indicate to a source gNB if it supports the reference time delivery and in which timeInfoType. Other messages and procedures discussed above are also applicable to these inter-RAT embodiments.

In some embodiments, when a UE is in dual connectivity with a MN and an SN, the reference time information can be transmitted to the UE from the MN via the MCG and from the SN via the SCG. In such case, unless the UE's connection to both nodes is released, the interruption time for reference time delivery due to UE mobility can be reduced to zero. This can be beneficial in mobility operations in which one of the SN and MN is changed but the other of the SN and MN is retained. For example, an MN that is handling reference time information delivery to the UE may indicate to the SN (e.g., via XnAP) to take over reference time delivery to the UE during an MN-related operation, such as change in MN. The source MN can provide the SN with any of reference time-related information discussed above in relation to single connectivity arrangements involving a source gNB and a target gNB. After the MN change is completed, the SN can indicate to the target MN to take over reference time delivery to the UE, also providing any reference time-related information as needed. Alternatively, the SN can continue reference time delivery to the UE, such as if the target MN is not capable of doing so or is synchronized to a different 5G GM clock than the SN.

As discussed above, the referenceTimeInfo IE shown in FIG. 7 is sent via unicast in the RRC message DLInformationTransfer. Conventionally, this message can be delivered by SRB1 or SRB2. SRB1 and SRB2 can be set up as MCG (non-split) bearers or split bearers with MN as the anchor node, but not as SCG (non-split) bearers. This can create difficulties for the SN to take over delivery of reference time information in DLInformationTransfer when the MN is unavailable.

In some embodiments, the existing DLInformationTransfer message can be modified so that it can also be transmitted by the SN, e.g., via an SCG (or SN-anchored) bearer such as SRB3. For example, DLInformationTransfer can be sent on SRB3 when it contains only referenceTimeInfo. Table 1 below shows an exemplary specification of this feature, with underline indicating changes compared to 3GPP TS 38.331 v16.1.0.

In both of the above embodiments, the UE's PSCell is the reference cell at the ending boundary of the SFN indicated by the referenceSFN field (i.e., in referenceTimeInfo IE). In other embodiments, the reference call at the ending boundary of the SFN indicated by referenceSFN can be the primary cell of the cell group carrying the SRB containing the unicast message that includes the referenceTimeInfo IE.

In DC, a UE maintains two connections to two nodes with two different propagation delays. In general, both MN and SN send TA MAC CEs to adjust the respective UE UL transmission timings. However, the UE only uses accumulated TA commands from the node providing the reference time information to calculate the necessary propagation delay compensation. In the case of MN unavailability when the SN continues to provide the reference tine information to the UE, the UE only considers MAC CEs with a TAG identity equal to 0 (i.e., the PTAG containing the SpCell) for propagation delay compensation. On the other hand, if reference time delivery is not supported on SN, UE can ignore the MAC CE sent on the SCG. This is exemplified by the following procedural text, in which underline indicates changes from 3GPP TS 38.321 v16.1.0, clause 5.2
*Begin exemplary text for 3GPP TS 38.321*
The MAC entity shall:
  1> when a Timing Advance Command MAC CE is received, and if an $N_{TA}$ (as defined in TS 38.211 [8]) has been maintained with the indicated TAG:
    2> apply the Timing Advance Command for the indicated TAG;
    2> If the indicated TAG is a PTAG:
      3> Indicate to the lower layer the TA value
    2> start or restart the timeAlignmentTimer associated with the indicated TAG.
*End Exemplary Text for 3GPP TS 38.321*

In other embodiment, UE can also consider absolute TA command MAC CEs for propagation delay compensation, which implicitly indicates that it is for the SpCell, even if it is not received in response to a MSGA transmission. This is

TABLE 1

- DLInformationTransfer
The DLInformationTransfer message is used for the downlink transfer of NAS dedicated information and timing information for the 5G internal system clock.
  Signalling radio bearer: SRB2 or SRB1 (only if SRB2 not established yet. If SRB2 is suspended, the network does not send this message until SRB2 is resumed) or SRB3 when it contains only referenceTimeInfo-r16.
  RLC-SAP: AM
  Logical channel: DCCH
  Direction: Network to UE In other embodiments, the referenceTimeInfo IE can be included in other unicast RRC messages that can be sent on SRB3, such as DLInformationTransferMDRC. Table 1 below shows an exemplary specification of this feature, with underline indicating changes compared to 3GPP TS 38.331 v16.1.0.

exemplified by the following procedural text that can be added to 3GPP TS 38.321 v16.1.0
*Begin Exemplary Text for 3GPP TS 38.321*
  1> when an Absolute Timing Advance Command is received and UE is configured to perform DL propagation delay compensation:

TABLE 2

- DLInformationTransferMRDC
The DLInformationTransferMRDC message is used for the downlink transfer of RRC messages during fast MCG link recovery or used for the delivery of timing information for the 5G internal system clock.

2> Indicate to the lower layer the TA value
2> start or restart the time AlignmentTimer associated with PTAG.
*End Exemplary Text for 3GPP TS 38.321*

Figure 13:
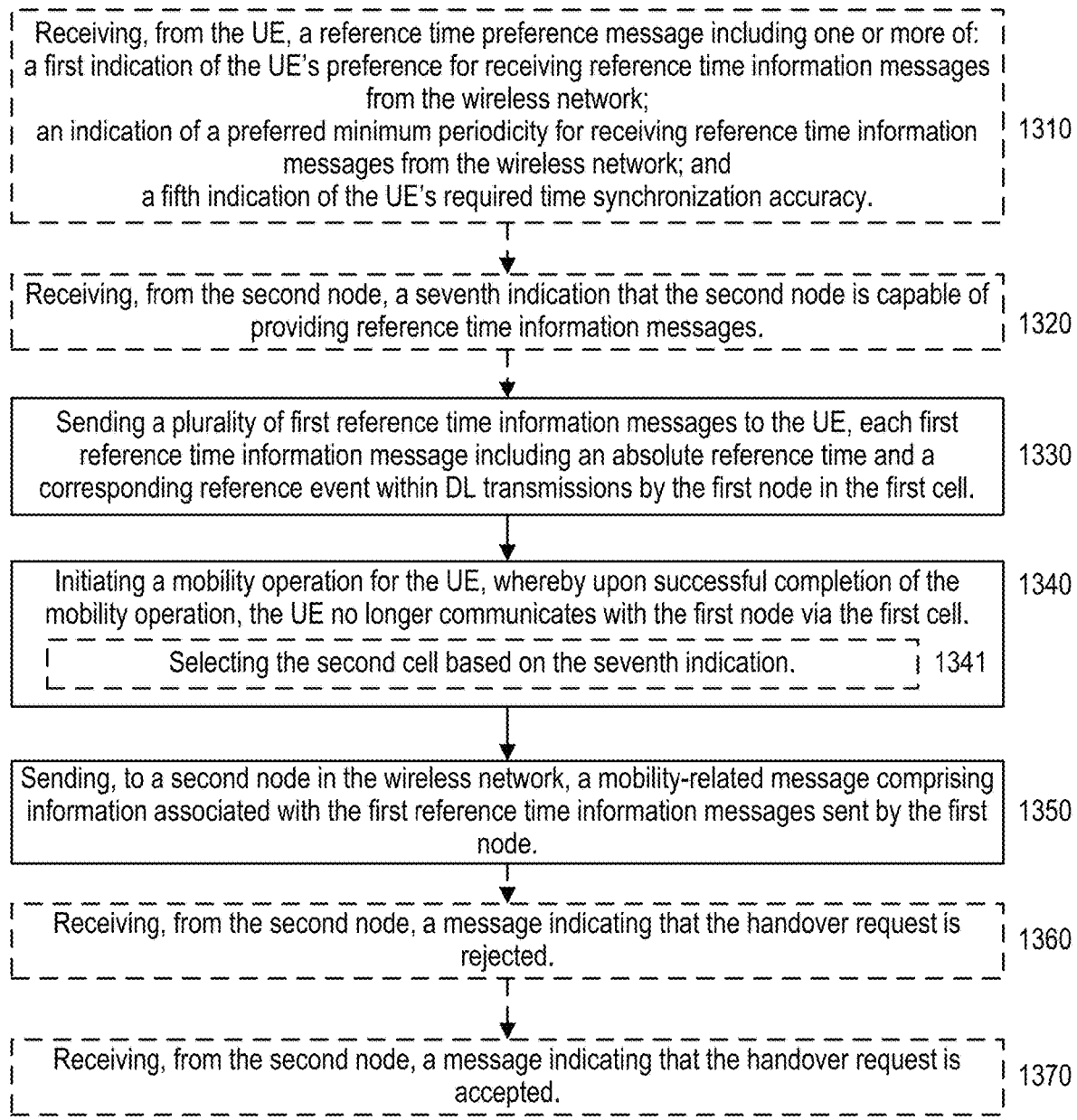
FIG. 13 shows a flow diagram illustrating an exemplary method (e.g., procedure) for a first node (e.g., base station, eNB, gNB, ng-eNB, etc.) in a wireless network (e.g., E-UTRAN, NG-RAN), according to various exemplary embodiments of the present disclosure.

These embodiments described above can be further illustrated with reference to FIGS. 13-14, which depict exemplary methods (e.g., procedures) for a first node and a second node, respectively, in a wireless network. Put differently, various features of the operations described below correspond to various embodiments described above. The exemplary methods shown in FIGS. 13-14 can be used cooperatively to provide various benefits, advantages, and/or solutions to problems, including those described herein. Although FIGS. 13-14 show specific blocks in particular orders, the operations corresponding to the blocks can be performed in different orders than shown and can be combined and/or divided into blocks having different functionality than shown. Optional blocks and/or operations are indicated by dashed lines.

In particular, FIG. 13 illustrates an exemplary method (e.g., procedure) for a first node configured to serve a first cell in a wireless network, according to various embodiments of the present disclosure. The exemplary method can be performed by a network node (e.g., base station, eNB, gNB, etc., or components thereof) in a wireless network (e.g., E-UTRAN, NG-RAN), such as described elsewhere herein.

The exemplary method can include the operations of block 1330, in which the first node can send a plurality of first reference time information messages to a UE. Each first reference time information message includes an absolute reference time and a corresponding reference event within DL transmissions by the first node in the first cell. The exemplary method can also include the operations of block 1340, in which the first node can initiate a mobility operation for the UE, whereby upon successful completion of the mobility operation, the UE no longer communicates with the first node via the first cell. The exemplary method can also include the operations of block 1350, in which the first node can send, to a second node in the wireless network, a mobility-related message comprising information associated with the first reference time information messages sent by the first node.

In some embodiments, the information associated with the first reference time information messages includes one or more of the following:
- a first indication of the UE's preference for receiving reference time information messages from the wireless network;
- a second indication of a periodicity of the first reference time information messages;
- a third indication of a time when a most recent first reference time information message was transmitted by the first node;
- a fourth indication of the accuracy of the first reference time information messages;
- a fifth indication of the UE's required time synchronization accuracy;
- a sixth indication of a clock source for the absolute reference times in the first reference time information messages.

In some embodiments, the exemplary method can also include the operations of block 1310, in which the first node can receive, from the UE, a reference time preference message including one or more of the following:
- the first indication of the UE's preference for receiving reference time information messages from the wireless network;
- an indication of a preferred minimum periodicity for receiving reference time information messages from the wireless network; and
- the fifth indication of the UE's required time synchronization accuracy.

In some embodiments, the periodicity indicated by the second indication is at least as frequent as the preferred minimum periodicity.

In some embodiments, the mobility operation can be a handover of the UE to a second cell served by the second node and the mobility-related message is a handover request. In some of these embodiments, the exemplary method can also include the operations of block 1360, in which the first node can receive, from the second node, a message indicating that the handover request is rejected. The message can also include a cause value indicating that the second node is not synchronized to a clock source for the absolute reference times in the first reference time information messages.

In other of these embodiments, the exemplary method can also include the operations of block 1370, in which the first node can receive, from the second node, a message indicating that the handover request is accepted. The message can also include a reconfiguration message, for the UE, that instructs the UE to transmit a reference time preference message to the second node after completing the handover.

In some embodiments, the exemplary method can also include the operations of block 1320, in which the first node can receive, from the second node, a seventh indication that the second node is capable of providing reference time information messages. In such embodiments, the initiating operations of block 1340 can include the operations of sub-block 1341, where the first node can select the second cell (e.g., for handover) based on the seventh indication.

In other embodiments, the first node can be a master node (MN) in dual connectivity (DC) towards the UE together with the second node as a secondary node (SN). In such embodiments, the mobility operation is a MN change from the first node to a third node in the wireless network.

Figure 14A:
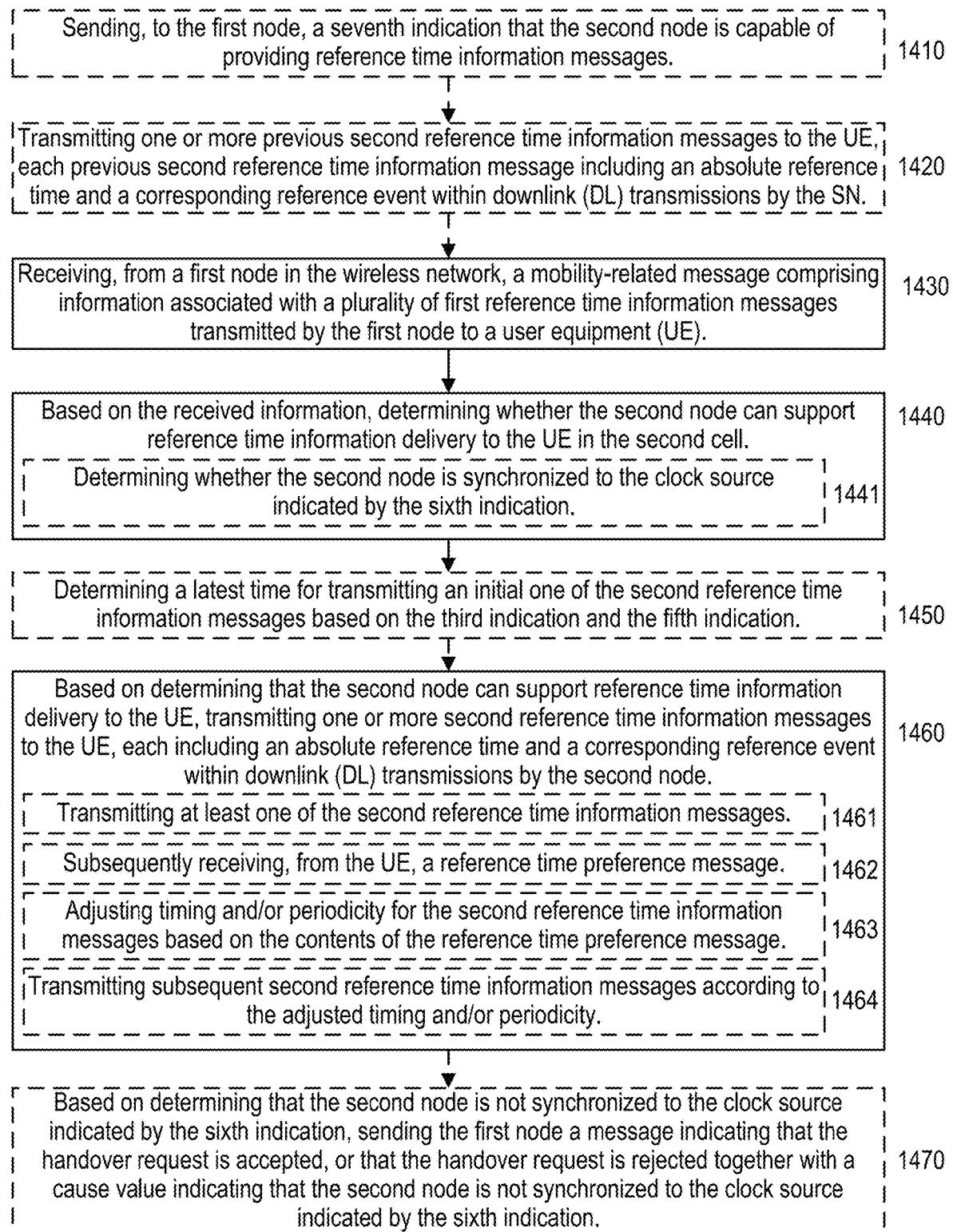

In addition, FIG. 14 (which includes FIGS. 14A-B) illustrates an exemplary method (e.g., procedure) for a second node configured to serve a second cell in a wireless network, according to various embodiments of the present disclosure. The exemplary method can be performed by a network node (e.g., base station, eNB, gNB, etc., or components thereof) in the wireless network (e.g., E-UTRAN, NG-RAN), such as described elsewhere herein.

The exemplary method can include the operations of block 1430, in which the second node can receive, from a first node in the wireless network, a mobility-related message comprising information associated with a plurality of first reference time information messages transmitted by the first node to a UE. The exemplary method can also include the operations of block 1440, in which the second node can, based on the received information, determine whether the second node can support reference time information delivery to the UE in the second cell. The exemplary method can also include the operations of block 1460, in which the second node can, based on determining that the second node can support reference time information delivery to the UE, transmit one or more second reference time information messages to the UE. Each second reference time information message can include an absolute reference time and a corresponding reference event within DL transmissions by the second node.

In some embodiments, the reference event can be an ending boundary of a subframe of DL transmissions by the second node in a primary cell of a cell group assigned to the UE. In such embodiments, the reference time information messages are transmitted on an SRB (e.g., SRB3) associated with the cell group.

In some embodiments, the information associated with the first reference time information messages can include any of the first through sixth indications described above in relation to first node embodiments.

In some embodiments, the periodicity indicated by the second indication is at least as frequent as the UE's preferred minimum periodicity. In some embodiments, the exemplary method can also include the operations of block 1450, in which the second node can determine a latest time for transmitting an initial one of the second reference time information messages based on the third indication and the fifth indication.

In some embodiments, transmitting the second reference time information messages (e.g., in block 1460) can include the operations of sub-blocks 1461-1464. In sub-blocks 1461-1462, the second node can transmit at least one of the second reference time information messages and subsequently receive, from the UE, a reference time preference message. In sub-blocks 1463-1464, the second node can adjust timing and/or periodicity for the second reference time information messages based on the contents of the reference time preference message, and transmit subsequent second reference time information messages according to the adjusted timing and/or periodicity.

In some embodiments, the reference time preference message (e.g., received in sub-block 1462) can include one or more of the following:
- an indication of the UE's preference for receiving periodic reference time information messages from the wireless network;
- an indication of a preferred minimum periodicity for receiving reference time information messages from the wireless network; and
- an indication of the UE's required time synchronization accuracy.

In some embodiments, the mobility-related message can be a handover request for the UE to the second cell. In some of these embodiments, the handover request can include a sixth indication of a clock source for the absolute reference times in the first reference time information messages transmitted by the first node. In such embodiments, the determining operations in block 1440 can include the operations of sub-block 1441, where the second node can determine whether it (i.e., the second node) is synchronized to the clock source indicated by the sixth indication. In such embodiments, the exemplary method can also include the operations of block 1470, where the second node can, based on determining that it is not synchronized to the clock source indicated by the sixth indication, send the first node a message indicating one of the following:
- that the handover request is accepted: or
- that the handover request is rejected together with a cause value indicating that the second node is not synchronized to the clock source indicated by the sixth indication.

In some embodiments, the message indicating that the handover request is accepted can include a reconfiguration message, for the UE, that instructs the UE to transmit a reference time preference message to the second node after completing the handover.

In some embodiments, the exemplary method can also include the operations of block 1410, where the second node can send, to the first node, a seventh indication that the second node is capable of providing reference time information messages. As mentioned above, the first node can base its selection of the target cell for handover on this seventh indication.

In some embodiments, the second node comprises a centralized unit (CU) and a distributed unit (DU). In such embodiments, the exemplary method can also include the operations of block 1480, in which the second node can, based on determining that it (i.e., the second node) can support reference time information delivery to the UE, perform one of the following operations by the CU:
- (sub-block 1481) initiating reference time information reporting by the DU to the CU;
- (sub-block 1482) adjusting a periodicity of ongoing reference time information reporting by the DU to the CU;
- (sub-block 1483) initiating broadcasting of reference time information messages by the DU: or
- (sub-block 1484) adjusting a periodicity of ongoing broadcasting of reference time information messages by the DU.

In some of these embodiments, at least a portion of the second reference time information messages are unicast (e.g., DLInformationTransfer) messages formed by the CU based on reference time information reported by the DU.

In some embodiments, the first node can be an MN in DC towards the UE together with the second node as an SN. In such embodiments, the mobility operation can be an MN change from the first node to a third node in the wireless network. In some of these embodiments, the exemplary method can also include the operations of block 1420, where the second node (i.e., the SN) can, before receiving the mobility-related message from the MN (e.g., in block 1430), transmit one or more previous second reference time information messages to the UE. Each previous second reference time information message can include an absolute reference time and a corresponding reference event within downlink (DL) transmissions by the SN. For example, the SN can transmit the previous second reference time information messages concurrently (i.e., within an overlapping time period but not necessarily simultaneously) with the MN's transmission of the first reference time information messages.

In other of these embodiments, the second reference time information messages can be transmitted during the mobility operation, such as when the MN is not available to transmit the first reference time information messages (e.g., during the MN change). In such embodiments, the exemplary method can also include the operations of block 1490, where the second node (i.e., the SN) can, after completion of the mobility operation, send to the third node (i.e., the new MN), a message comprising information associated with the second reference time information messages sent by the second node to the UE. This information can include any of the indications discussed above in relation to the first reference time information messages. In this manner, the new: MN can resume transmitting reference time information messages to the UE.

Figure 15:
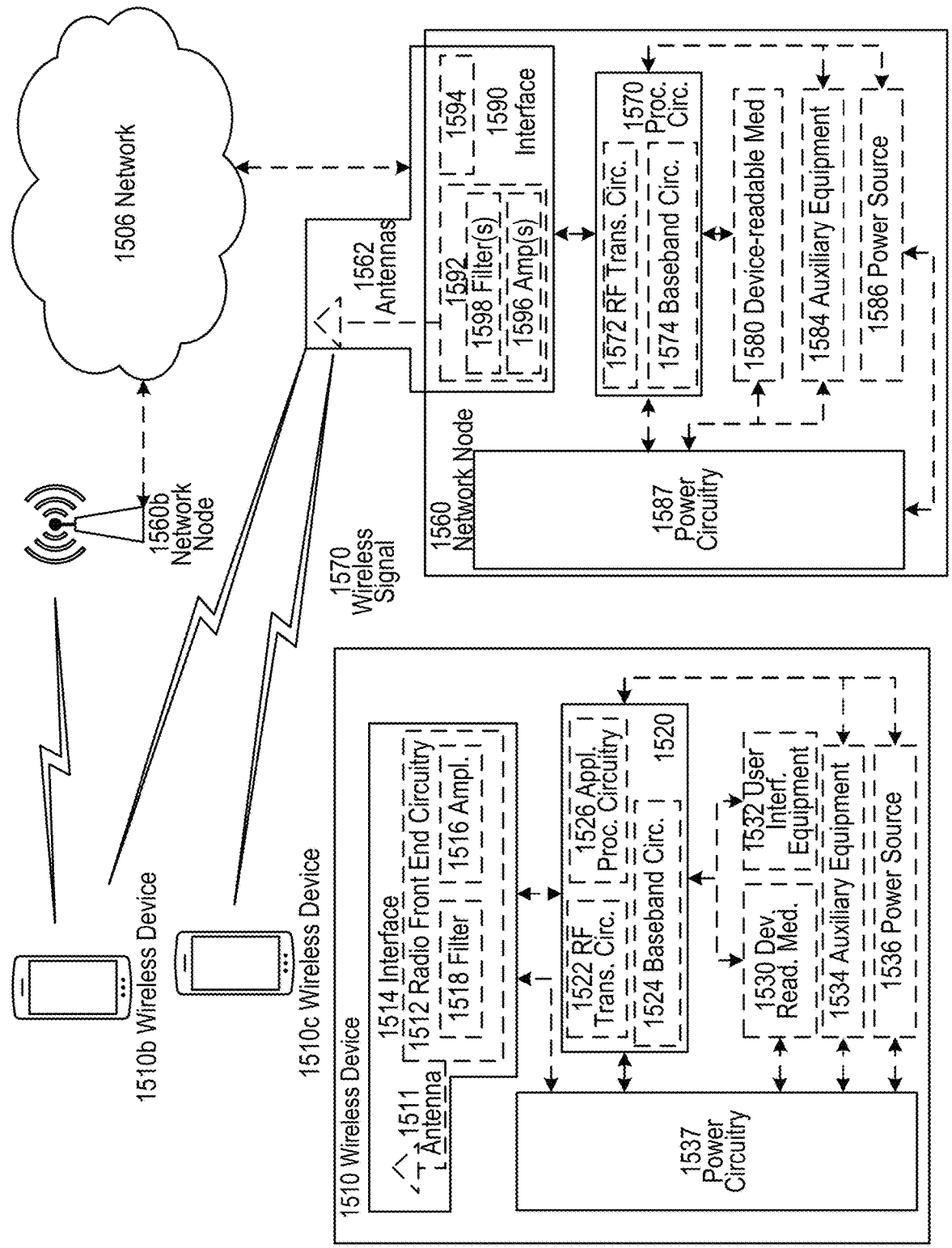
FIG. 15 illustrates an exemplary wireless network, according to various exemplary embodiments of the present disclosure.

Although the subject matter described herein can be implemented in any appropriate type of system using any suitable components, the embodiments disclosed herein are described in relation to a wireless network, such as the example wireless network illustrated in FIG. 15. For simplicity, the wireless network of FIG. 15 only depicts network 1506, network nodes 1560 and 1560*b*, and WDs 1510, 1510*b*, and 1510*c*. In practice, a wireless network can further include any additional elements suitable to support communication between wireless devices or between a wireless device and another communication device, such as a landline telephone, a service provider, or any other network node or end device. Of the illustrated components, network node 1560 and wireless device (WD) 1510 are depicted with additional detail. The wireless network can provide communication and other types of services to one or more wireless devices to facilitate the wireless devices access to and/or use of the services provided by, or via, the wireless network.

The wireless network can comprise and/or interface with any type of communication, telecommunication, data, cellular, and/or radio network or other similar type of system. In some embodiments, the wireless network can be configured to operate according to specific standards or other types of predefined rules or procedures. Thus, particular embodiments of the wireless network can implement communication standards, such as Global System for Mobile Communications (GSM), Universal Mobile Telecommunications System (UMTS), Long Term Evolution (LTE), and/or other suitable 2G, 3G, 4G, or 5G standards: wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1506 can comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1560 and WD 1510 comprise various components described in more detail below: These components work together in order to provide network node and/or wireless device functionality, such as providing wireless connections in a wireless network. In different embodiments, the wireless network can comprise any number of wired or wireless networks, network nodes, base stations, controllers, wireless devices, relay stations, and/or any other components or systems that can facilitate or participate in the communication of data and/or signals whether via wired or wireless connections.

Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations can be categorized based on the amount of coverage they provide (or, stated differently, their transmit power level) and can then also be referred to as femto base stations, pico base stations, micro base stations, or macro base stations. A base station can be a relay node or a relay donor node controlling a relay. A network node can also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station can also be referred to as nodes in a distributed antenna system (DAS).

Further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O & M nodes, OSS nodes, SON nodes, positioning nodes (e.g., E-SMLCs), and/or MDTs. As another example, a network node can be a virtual network node as described in more detail below. More generally, however, network nodes can represent any suitable device (or group of devices) capable, configured, arranged, and/or operable to enable and/or provide a wireless device with access to the wireless network or to provide some service to a wireless device that has accessed the wireless network.

In FIG. 15, network node 1560 includes processing circuitry 1570, device readable medium 1580, interface 1590, auxiliary equipment 1584, power source 1586, power circuitry 1587, and antenna 1562. Although network node 1560 illustrated in the example wireless network of FIG. 15 can represent a device that includes the illustrated combination of hardware components, other embodiments can comprise network nodes with different combinations of components. It is to be understood that a network node comprises any suitable combination of hardware and/or software needed to perform the tasks, features, functions and methods and/or procedures disclosed herein. Moreover, while the components of network node 1560 are depicted as single boxes located within a larger box, or nested within multiple boxes, in practice, a network node can comprise multiple different physical components that make up a single illustrated component (e.g., device readable medium 1580) can comprise multiple separate hard drives as well as multiple RAM modules).

Similarly, network node 1560 can be composed of multiple physically separate components (e.g., a NodeB component and an RNC component, or a BTS component and a BSC component, etc.), which can each have their own respective components. In certain scenarios in which network node 1560 comprises multiple separate components (e.g., BTS and BSC components), one or more of the separate components can be shared among several network nodes. For example, a single RNC can control multiple NodeB's. In such a scenario, each unique NodeB and RNC pair, can in some instances be considered a single separate network node. In some embodiments, network node 1560 can be configured to support multiple radio access technologies (RATs). In such embodiments, some components can be duplicated (e.g., separate device readable medium 1580 for the different RATs) and some components can be reused (e.g., the same antenna 1562 can be shared by the RATs). Network node 1560 can also include multiple sets of the various illustrated components for different wireless technologies integrated into network node 1560, such as, for example, GSM, WCDMA, LTE, NR, WiFi, or Bluetooth wireless technologies. These wireless technologies can be integrated into the same or different chip or set of chips and other components within network node 1560.

Processing circuitry 1570 can be configured to perform any determining, calculating, or similar operations (e.g., certain obtaining operations) described herein as being provided by a network node. These operations performed by processing circuitry 1570 can include processing information obtained by processing circuitry 1570 by, for example, converting the obtained information into other information, comparing the obtained information or converted information to information stored in the network node, and/or performing one or more operations based on the obtained information or converted information, and as a result of said processing making a determination.

Processing circuitry 1570 can comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide various functionality of network node 1560, either alone or in conjunction with other network node 1560 components (e.g., device readable medium 1580). Such functionality can include any of the various wireless features, functions, or benefits discussed herein.

For example, processing circuitry 1570) can execute instructions stored in device readable medium 1580 or in memory within processing circuitry 1570). In some embodiments, processing circuitry 1570 can include a system on a chip (SOC). As a more specific example, instructions (also referred to as a computer program product) stored in medium 1580 can include instructions that, when executed by processing circuitry 1570), can configure network node 1560 to perform operations corresponding to various exemplary methods (e.g., procedures) described herein.

In some embodiments, processing circuitry 1570 can include one or more of radio frequency (RF) transceiver circuitry 1572 and baseband processing circuitry 1574. In some embodiments, radio frequency (RF) transceiver circuitry 1572 and baseband processing circuitry 1574 can be on separate chips (or sets of chips), boards, or units, such as radio units and digital units. In alternative embodiments, part or all of RF transceiver circuitry 1572 and baseband processing circuitry 1574 can be on the same chip or set of chips, boards, or units In certain embodiments, some or all of the functionality described herein as being provided by a network node, base station, eNB or other such network device can be performed by processing circuitry 1570) executing instructions stored on device readable medium 1580 or memory within processing circuitry 1570). In alternative embodiments, some or all of the functionality can be provided by processing circuitry 1570 without executing instructions stored on a separate or discrete device readable medium, such as in a hard-wired manner. In any of those embodiments, whether executing instructions stored on a device readable storage medium or not, processing circuitry 1570 can be configured to perform the described functionality. The benefits provided by such functionality are not limited to processing circuitry 1570 alone or to other components of network node 1560 but are enjoyed by network node 1560 as a whole, and/or by end users and the wireless network generally.

Device readable medium 1580 can comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that can be used by processing circuitry 1570. Device readable medium 1580 can store any suitable instructions, data or information, including a computer program, software, an application including one or more of logic, rules, code, tables, etc, and/or other instructions capable of being executed by processing circuitry 1570 and, utilized by network node 1560. Device readable medium 1580 can be used to store any calculations made by processing circuitry 1570 and/or any data received via interface 1590. In some embodiments, processing circuitry 1570 and device readable medium 1580 can be considered to be integrated.

Interface 1590 is used in the wired or wireless communication of signaling and/or data between network node 1560, network 1506, and/or WDs 1510. As illustrated, interface 1590) comprises port(s)/terminal(s) 1594 to send and receive data, for example to and from network 1506 over a wired connection. Interface 1590 also includes radio front end circuitry 1592 that can be coupled to, or in certain embodiments a part of, antenna 1562. Radio front end circuitry 1592 comprises filters 1598 and amplifiers 1596. Radio front end circuitry 1592 can be connected to antenna 1562 and processing circuitry 1570. Radio front end circuitry can be configured to condition signals communicated between antenna 1562 and processing circuitry 1570. Radio front end circuitry 1592 can receive digital data that is to be sent out to other network nodes or WDs via a wireless connection. Radio front end circuitry 1592 can convert the digital data into a radio signal having the appropriate channel and bandwidth parameters using a combination of filters 1598 and/or amplifiers 1596. The radio signal can then be transmitted via antenna 1562. Similarly, when receiving data, antenna 1562 can collect radio signals which are then converted into digital data by radio front end circuitry 1592. The digital data can be passed to processing circuitry 1570. In other embodiments, the interface can comprise different components and/or different combinations of components.

In certain alternative embodiments, network node 1560 may not include separate radio front end circuitry 1592, instead, processing circuitry 1570 can comprise radio front end circuitry and can be connected to antenna 1562 without separate radio front end circuitry 1592. Similarly, in some embodiments, all or some of RF transceiver circuitry 1572 can be considered a part of interface 1590. In still other embodiments, interface 1590 can include one or more ports or terminals 1594, radio front end circuitry 1592, and RF transceiver circuitry 1572, as part of a radio unit (not shown), and interface 1590 can communicate with baseband processing circuitry 1574, which is part of a digital unit (not shown).

Antenna 1562 can include one or more antennas, or antenna arrays, configured to send and/or receive wireless signals. Antenna 1562 can be coupled to radio front end circuitry 1590 and can be any type of antenna capable of transmitting and receiving data and/or signals wirelessly. In some embodiments, antenna 1562 can comprise one or more omni-directional, sector or panel antennas operable to transmit/receive radio signals between, for example, 2 GHZ and 66 GHZ. An omni-directional antenna can be used to transmit/receive radio signals in any direction, a sector antenna can be used to transmit/receive radio signals from devices within a particular area, and a panel antenna can be a line of sight antenna used to transmit/receive radio signals in a relatively straight line. In some instances, the use of more than one antenna can be referred to as MIMO. In certain embodiments, antenna 1562 can be separate from network node 1560 and can be connectable to network node 1560 through an interface or port.

Antenna 1562, interface 1590), and/or processing circuitry 1570) can be configured to perform any receiving operations and/or certain obtaining operations described herein as being performed by a network node. Any information, data and/or signals can be received from a wireless device, another network node and/or any other network equipment. Similarly, antenna 1562, interface 1590, and/or processing circuitry 1570 can be configured to perform any transmitting operations described herein as being performed by a network node. Any information, data and/or signals can be transmitted to a wireless device, another network node and/or any other network equipment.

Power circuitry 1587 can comprise, or be coupled to, power management circuitry and can be configured to supply the components of network node 1560 with power for performing the functionality described herein. Power circuitry 1587 can receive power from power source 1586. Power source 1586 and/or power circuitry 1587 can be configured to provide power to the various components of network node 1560 in a form suitable for the respective components (e.g., at a voltage and current level needed for each respective component). Power source 1586 can either be included in, or external to, power circuitry 1587 and/or network node 1560. For example, network node 1560 can be connectable to an external power source (e.g., an electricity outlet) via an input circuitry or interface such as an electrical cable, whereby the external power source supplies power to power circuitry 1587. As a further example, power source 1586 can comprise a source of power in the form of a battery or battery pack which is connected to, or integrated in, power circuitry 1587. The battery can provide backup power should the external power source fail. Other types of power sources, such as photovoltaic devices, can also be used.

Alternative embodiments of network node 1560 can include additional components beyond those shown in FIG. 15 that can be responsible for providing certain aspects of the network node's functionality, including any of the functionality described herein and/or any functionality necessary to support the subject matter described herein. For example, network node 1560 can include user interface equipment to allow and/or facilitate input of information into network node 1560 and to allow and/or facilitate output of information from network node 1560. This can allow and/or facilitate a user to perform diagnostic, maintenance, repair, and other administrative functions for network node 1560.

In some embodiments, a wireless device (WD, e.g., WD 1510) can be configured to transmit and/or receive information without direct human interaction. For instance, a WD can be designed to transmit information to a network on a predetermined schedule, when triggered by an internal or external event, or in response to requests from the network. Examples of a WD include, but are not limited to, smart phones, mobile phones, cell phones, voice over IP (VOIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices. Internet-of-Things (IoT) devices, vehicle-mounted wireless terminal devices, etc.

A WD can support device-to-device (D2D) communication, for example by implementing a 3GPP standard for sidelink communication, vehicle-to-vehicle (V2V), vehicle-to-infrastructure (V2I), vehicle-to-everything (V2X) and can in this case be referred to as a D2D communication device. As yet another specific example, in an Internet of Things (IoT) scenario, a WD can represent a machine or other device that performs monitoring and/or measurements and transmits the results of such monitoring and/or measurements to another WD and/or a network node. The WD can in this case be a machine-to-machine (M2M) device, which can in a 3GPP context be referred to as an MTC device. As one particular example, the WD can be a UE implementing the 3GPP narrow band internet of things (NB-IoT) standard. Particular examples of such machines or devices are sensors, metering devices such as power meters, industrial machinery, or home or personal appliances (e.g., refrigerators, televisions, etc.) personal wearables (e.g., watches, fitness trackers, etc.). In other scenarios, a WD can represent a vehicle or other equipment that is capable of monitoring and/or reporting on its operational status or other functions associated with its operation. A WD as described above can represent the endpoint of a wireless connection, in which case the device can be referred to as a wireless terminal. Furthermore, a WD as described above can be mobile, in which case it can also be referred to as a mobile device or a mobile terminal.

As illustrated, wireless device 1510 includes antenna 1511, interface 1514, processing circuitry 1520, device readable medium 1530, user interface equipment 1532, auxiliary equipment 1534, power source 1536 and power circuitry 1537. WD 1510 can include multiple sets of one or more of the illustrated components for different wireless technologies supported by WD 1510, such as, for example, GSM, WCDMA, LTE, NR, WiFi, WiMAX, or Bluetooth wireless technologies, just to mention a few. These wireless technologies can be integrated into the same or different chips or set of chips as other components within WD 1510.

Antenna 1511 can include one or more antennas or antenna arrays, configured to send and/or receive wireless signals, and is connected to interface 1514. In certain alternative embodiments, antenna 1511 can be separate from WD 1510 and be connectable to WD 1510 through an interface or port. Antenna 1511, interface 1514, and/or processing circuitry 1520 can be configured to perform any receiving or transmitting operations described herein as being performed by a WD. Any information, data and/or signals can be received from a network node and/or another WD. In some embodiments, radio front end circuitry and/or antenna 1511 can be considered an interface.

As illustrated, interface 1514 comprises radio front end circuitry 1512 and antenna 1511. Radio front end circuitry 1512 comprise one or more filters 1518 and amplifiers 1516. Radio front end circuitry 1514 is connected to antenna 1511 and processing circuitry 1520 and can be configured to condition signals communicated between antenna 1511 and processing circuitry 1520. Radio front end circuitry 1512 can be coupled to or a part of antenna 1511. In some embodiments. WD 1510 may not include separate radio front end circuitry 1512; rather, processing circuitry 1520 can comprise radio front end circuitry and can be connected to antenna 1511. Similarly, in some embodiments, some or all of RF transceiver circuitry 1522 can be considered a part of interface 1514. Radio front end circuitry 1512 can receive digital data that is to be sent out to other network nodes or WDs via a wireless connection. Radio front end circuitry 1512 can convert the digital data into a radio signal having the appropriate channel and bandwidth parameters using a combination of filters 1518 and/or amplifiers 1516. The radio signal can then be transmitted via antenna 1511. Similarly, when receiving data, antenna 1511 can collect radio signals which are then converted into digital data by radio front end circuitry 1512. The digital data can be passed to processing circuitry 1520. In other embodiments, the interface can comprise different components and/or different combinations of components.

Processing circuitry 1520 can comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide WD 1510 functionality either alone or in combination with other WD 1510 components, such as device readable medium 1530. Such functionality can include any of the various wireless features or benefits discussed herein.

For example, processing circuitry 1520 can execute instructions stored in device readable medium 1530 or in memory within processing circuitry 1520 to provide the functionality disclosed herein. More specifically, instructions (also referred to as a computer program product) stored in medium 1530 can include instructions that, when executed by processor 1520, can configure wireless device 1510 to perform operations corresponding to various exemplary methods (e.g., procedures) described herein.

As illustrated, processing circuitry 1520 includes one or more of RF transceiver circuitry 1522, baseband processing circuitry 1524, and application processing circuitry 1526. In other embodiments, the processing circuitry can comprise different components and/or different combinations of components. In certain embodiments processing circuitry 1520 of WD 1510 can comprise a SOC. In some embodiments. RF transceiver circuitry 1522, baseband processing circuitry 1524, and application processing circuitry 1526 can be on separate chips or sets of chips. In alternative embodiments, part or all of baseband processing circuitry 1524 and application processing circuitry 1526 can be combined into one chip or set of chips, and RF transceiver circuitry 1522 can be on a separate chip or set of chips. In still alternative embodiments, part or all of RF transceiver circuitry 1522 and baseband processing circuitry 1524 can be on the same chip or set of chips, and application processing circuitry 1526 can be on a separate chip or set of chips. In yet other alternative embodiments, part or all of RF transceiver circuitry 1522, baseband processing circuitry 1524, and application processing circuitry 1526 can be combined in the same chip or set of chips. In some embodiments. RF transceiver circuitry 1522 can be a part of interface 1514. RF transceiver circuitry 1522 can condition RF signals for processing circuitry 1520.

In certain embodiments, some or all of the functionality described herein as being performed by a WD can be provided by processing circuitry 1520 executing instructions stored on device readable medium 1530, which in certain embodiments can be a computer-readable storage medium. In alternative embodiments, some or all of the functionality can be provided by processing circuitry 1520 without executing instructions stored on a separate or discrete device readable storage medium, such as in a hard-wired manner. In any of those particular embodiments, whether executing instructions stored on a device readable storage medium or not, processing circuitry 1520 can be configured to perform the described functionality. The benefits provided by such functionality are not limited to processing circuitry 1520 alone or to other components of WD 1510, but are enjoyed by WD 1510 as a whole, and/or by end users and the wireless network generally.

Processing circuitry 1520 can be configured to perform any determining, calculating, or similar operations (e.g., certain obtaining operations) described herein as being performed by a WD. These operations, as performed by processing circuitry 1520, can include processing information obtained by processing circuitry 1520 by, for example, converting the obtained information into other information, comparing the obtained information or converted information to information stored by WD 1510, and/or performing one or more operations based on the obtained information or converted information, and as a result of said processing making a determination.

Device readable medium 1530) can be operable to store a computer program, software, an application including one or more of logic, rules, code, tables, etc, and/or other instructions capable of being executed by processing circuitry 1520. Device readable medium 1530 can include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that can be used by processing circuitry 1520. In some embodiments, processing circuitry 1520 and device readable medium 1530 can be considered to be integrated.

User interface equipment 1532 can include components that allow and/or facilitate a human user to interact with WD 1510. Such interaction can be of many forms, such as visual, audial, tactile, etc. User interface equipment 1532 can be operable to produce output to the user and to allow and/or facilitate the user to provide input to WD 1510. The type of interaction can vary depending on the type of user interface equipment 1532 installed in WD 1510. For example, if WD 1510 is a smart phone, the interaction can be via a touch screen: if WD 1510 is a smart meter, the interaction can be through a screen that provides usage (e.g., the number of gallons used) or a speaker that provides an audible alert (e.g., if smoke is detected). User interface equipment 1532 can include input interfaces, devices and circuits, and output interfaces, devices and circuits. User interface equipment 1532 can be configured to allow and/or facilitate input of information into WD 1510 and is connected to processing circuitry 1520 to allow and/or facilitate processing circuitry 1520 to process the input information. User interface equipment 1532 can include, for example, a microphone, a proximity or other sensor, keys/buttons, a touch display, one or more cameras, a USB port, or other input circuitry. User interface equipment 1532 is also configured to allow and/or facilitate output of information from WD 1510, and to allow and/or facilitate processing circuitry 1520 to output information from WD 1510. User interface equipment 1532 can include, for example, a speaker, a display, vibrating circuitry, a USB port, a headphone interface, or other output circuitry. Using one or more input and output interfaces, devices, and circuits, of user interface equipment 1532, WD 1510 can communicate with end users and/or the wireless network and allow and/or facilitate them to benefit from the functionality described herein.

Auxiliary equipment 1534 is operable to provide more specific functionality which may not be generally performed by WDs. This can comprise specialized sensors for doing measurements for various purposes, interfaces for additional types of communication such as wired communications etc. The inclusion and type of components of auxiliary equipment 1534 can vary depending on the embodiment and/or scenario.

Power source 1536 can, in some embodiments, be in the form of a battery or battery pack. Other types of power sources, such as an external power source (e.g., an electricity outlet), photovoltaic devices or power cells, can also be used. WD 1510 can further comprise power circuitry 1537 for delivering power from power source 1536 to the various parts of WD 1510 which need power from power source 1536 to carry out any functionality described or indicated herein. Power circuitry 1537 can in certain embodiments comprise power management circuitry. Power circuitry 1537 can additionally or alternatively be operable to receive power from an external power source: in which case WD 1510 can be connectable to the external power source (such as an electricity outlet) via input circuitry or an interface such as an electrical power cable. Power circuitry 1537 can also in certain embodiments be operable to deliver power from an external power source to power source 1536. This can be, for example, for the charging of power source 1536. Power circuitry 1537 can perform any converting or other modification to the power from power source 1536 to make it suitable for supply to the respective components of WD 1510.

Figure 16:
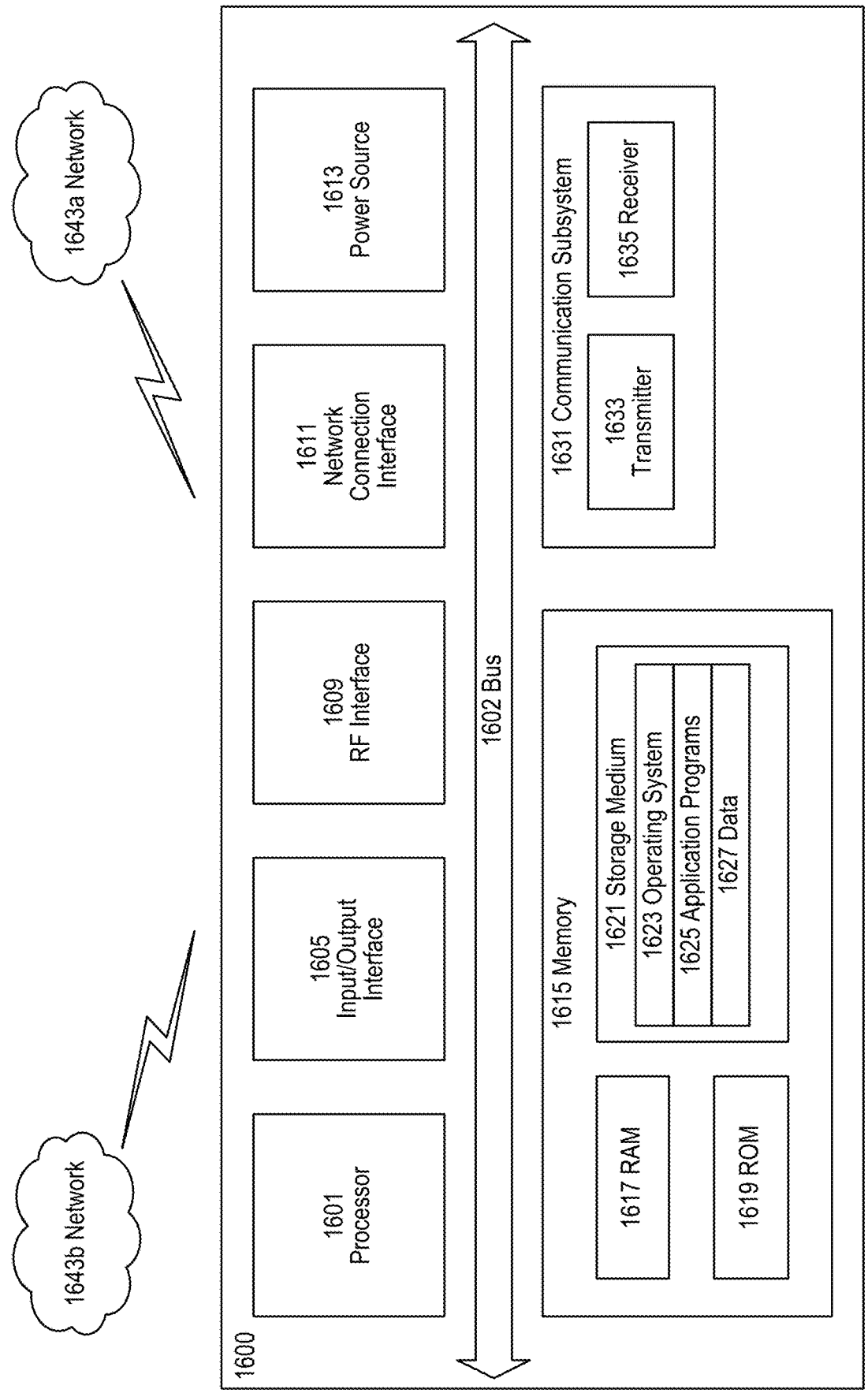
FIG. 16 illustrates an exemplary UE, according to various exemplary embodiments of the present disclosure.

FIG. 16 illustrates one embodiment of a UE in accordance with various aspects described herein. As used herein, a user equipment or UE may not necessarily have a user in the sense of a human user who owns and/or operates the relevant device. Instead, a UE can represent a device that is intended for sale to, or operation by, a human user but which may not, or which may not initially, be associated with a specific human user (e.g., a smart sprinkler controller). Alternatively, a UE can represent a device that is not intended for sale to, or operation by, an end user but which can be associated with or operated for the benefit of a user (e.g., a smart power meter). UE 1600 can be any UE identified by the 3rd Generation Partnership Project (3GPP), including a NB-IoT UE, a machine type communication (MTC) UE, and/or an enhanced MTC (eMTC) UE. UE 1600, as illustrated in FIG. 16, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE can be used interchangeable. Accordingly, although FIG. 16 is a UE, the components discussed herein are equally applicable to a WD, and vice-versa.

In FIG. 16, UE 1600 includes processing circuitry 1601 that is operatively coupled to input/output interface 1605, radio frequency (RF) interface 1609, network connection interface 1611, memory 1615 including random access memory (RAM) 1617, read-only memory (ROM) 1619, and storage medium 1621 or the like, communication subsystem 1631, power source 1633, and/or any other component, or any combination thereof. Storage medium 1621 includes operating system 1623, application program 1625, and data 1627. In other embodiments, storage medium 1621 can include other similar types of information. Certain UEs can utilize all of the components shown in FIG. 16, or only a subset of the components. The level of integration between the components can vary from one UE to another UE. Further, certain UEs can contain multiple instances of a component, such as multiple processors, memories, transceivers, transmitters, receivers, etc.

In FIG. 16, processing circuitry 1601 can be configured to process computer instructions and data. Processing circuitry 1601 can be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware: one or more stored program, general-purpose processors, such as a microprocessor or Digital Signal Processor (DSP), together with appropriate software: or any combination of the above. For example, the processing circuitry 1601 can include two central processing units (CPUs). Data can be information in a form suitable for use by a computer.

In the depicted embodiment, input/output interface 1605 can be configured to provide a communication interface to an input device, output device, or input and output device. UE 1600 can be configured to use an output device via input/output interface 1605. An output device can use the same type of interface port as an input device. For example, a USB port can be used to provide input to and output from UE 1600. The output device can be a speaker, a sound card, a video card, a display, a monitor, a printer, an actuator, an emitter, a smartcard, another output device, or any combination thereof. UE 1600 can be configured to use an input device via input/output interface 1605 to allow and/or facilitate a user to capture information into UE 1600. The input device can include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display can include a capacitive or resistive touch sensor to sense input from a user. A sensor can be, for instance, an accelerometer, a gyroscope, a tilt sensor, a force sensor, a magnetometer, an optical sensor, a proximity sensor, another like sensor, or any combination thereof. For example, the input device can be an accelerometer, a magnetometer, a digital camera, a microphone, and an optical sensor.

In FIG. 16. RF interface 1609 can be configured to provide a communication interface to RF components such as a transmitter, a receiver, and an antenna. Network connection interface 1611 can be configured to provide a communication interface to network 1643*a*. Network 1643*a* can encompass wired and/or wireless networks such as a local-area network (LAN), a wide-area network (WAN), a computer network, a wireless network, a telecommunications network, another like network or any combination thereof. For example, network 1643*a* can comprise a Wi-Fi network. Network connection interface 1611 can be configured to include a receiver and a transmitter interface used to communicate with one or more other devices over a communication network according to one or more communication protocols, such as Ethernet. TCP/IP. SONET. ATM, or the like. Network connection interface 1611 can implement receiver and transmitter functionality appropriate to the communication network links (e.g., optical, electrical, and the like). The transmitter and receiver functions can share circuit components, software or firmware, or alternatively can be implemented separately.

RAM 1617 can be configured to interface via bus 1602 to processing circuitry 1601 to provide storage or caching of data or computer instructions during the execution of software programs such as the operating system, application programs, and device drivers. ROM 1619 can be configured to provide computer instructions or data to processing circuitry 1601. For example, ROM 1619 can be configured to store invariant low-level system code or data for basic system functions such as basic input and output (I/O), startup, or reception of keystrokes from a keyboard that are stored in a non-volatile memory. Storage medium 1621 can be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives.

In one example, storage medium 1621 can be configured to include operating system 1623; application program 1625 such as a web browser application, a widget or gadget engine or another application; and data file 1627. Storage medium 1621 can store, for use by UE 1600, any of a variety of various operating systems or combinations of operating systems. For example, application program 1625 can include executable program instructions (also referred to as a computer program product) that, when executed by processor 1601, can configure UE 1600 to perform operations corresponding to various exemplary methods (e.g., procedures) described herein.

Storage medium 1621 can be configured to include a number of physical drive units, such as redundant array of independent disks (RAID), floppy disk drive, flash memory. USB flash drive, external hard disk drive, thumb drive, pen drive, key drive, high-density digital versatile disc (HD-DVD) optical disc drive, internal hard disk drive. Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1621 can allow and/or facilitate UE 1600 to access computer-executable instructions, application programs or the like, stored on transitory or non-transitory memory media, to off-load data, or to upload data. An article of manufacture, such as one utilizing a communication system can be tangibly embodied in storage medium 1621, which can comprise a device readable medium.

In FIG. 16, processing circuitry 1601 can be configured to communicate with network 1643b using communication subsystem 1631. Network 1643a and network 1643b can be the same network or networks or different network or networks. Communication subsystem 1631 can be configured to include one or more transceivers used to communicate with network 1643b. For example, communication subsystem 1631 can be configured to include one or more transceivers used to communicate with one or more remote transceivers of another device capable of wireless communication such as another WD. UE, or base station of a radio access network (RAN) according to one or more communication protocols, such as IEEE 802.16. CDMA. WCDMA. GSM. LTE. UTRAN. WiMax, or the like. Each transceiver can include transmitter 1633 and/or receiver 1635 to implement transmitter or receiver functionality, respectively, appropriate to the RAN links (e.g., frequency allocations and the like). Further, transmitter 1633 and receiver 1635 of each transceiver can share circuit components, software or firmware, or alternatively can be implemented separately.

In the illustrated embodiment, the communication functions of communication subsystem 1631 can include data communication, voice communication, multimedia communication, short-range communications such as Bluetooth, near-field communication, location-based communication such as the use of the global positioning system (GPS) to determine a location, another like communication function, or any combination thereof. For example, communication subsystem 1631 can include cellular communication, Wi-Fi communication, Bluetooth communication, and GPS communication. Network 1643b can encompass wired and/or wireless networks such as a local-area network (LAN), a wide-area network (WAN), a computer network, a wireless network, a telecommunications network, another like network or any combination thereof. For example, network 1643b can be a cellular network, a Wi-Fi network, and/or a near-field network. Power source 1613 can be configured to provide alternating current (AC) or direct current (DC) power to components of UE 1600.

The features, benefits and/or functions described herein can be implemented in one of the components of UE 1600 or partitioned across multiple components of UE 1600. Further, the features, benefits, and/or functions described herein can be implemented in any combination of hardware, software or firmware. In one example, communication subsystem 1631 can be configured to include any of the components described herein. Further, processing circuitry 1601 can be configured to communicate with any of such components over bus 1602. In another example, any of such components can be represented by program instructions stored in memory that when executed by processing circuitry 1601 perform the corresponding functions described herein. In another example, the functionality of any of such components can be partitioned between processing circuitry 1601 and communication subsystem 1631. In another example, the non-computationally intensive functions of any of such components can be implemented in software or firmware and the computationally intensive functions can be implemented in hardware.

Figure 17:
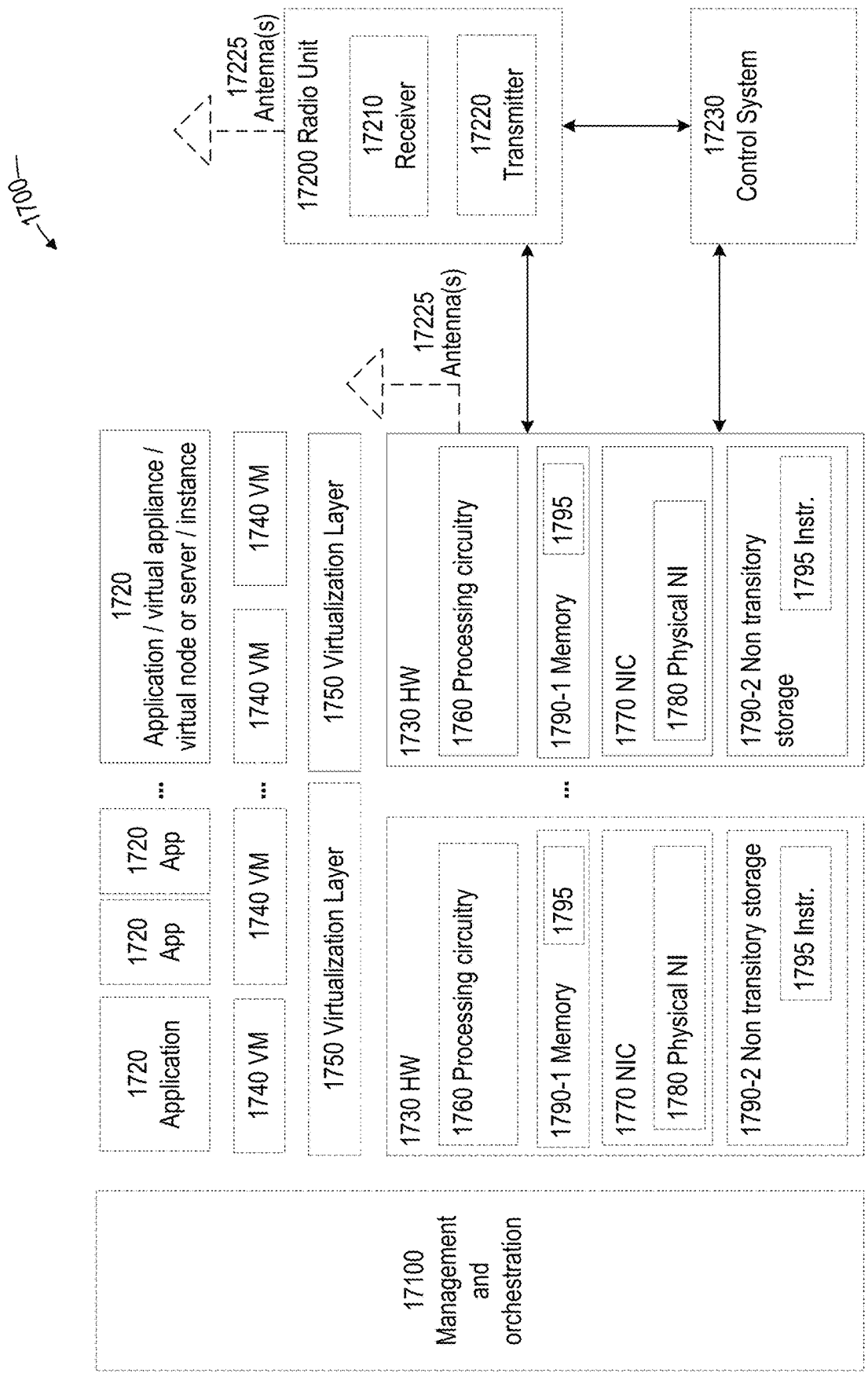
FIG. 17 is a block diagram illustrating an exemplary virtualization environment usable for implementing various exemplary embodiments of the present disclosure.

FIG. 17 is a schematic block diagram illustrating a virtualization environment 1700 in which functions implemented by some embodiments can be virtualized. In the present context, virtualizing means creating virtual versions of apparatuses or devices which can include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein can be implemented as virtual components executed by one or more virtual machines implemented in one or more virtual environments 1700 hosted by one or more of hardware nodes 1730. Further, in embodiments in which the virtual node is not a radio access node or does not require radio connectivity (e.g., a core network node), then the network node can be entirely virtualized.

The functions can be implemented by one or more applications 1720 (which can alternatively be called software instances, virtual appliances, network functions, virtual nodes, virtual network functions, etc.) operative to implement some of the features, functions, and/or benefits of some of the embodiments disclosed herein. Applications 1720 are run in virtualization environment 1700 which provides hardware 1730 comprising processing circuitry 1760) and memory 1790. Memory 1790 contains instructions 1795 executable by processing circuitry 1760 whereby application 1720 is operative to provide one or more of the features, benefits, and/or functions disclosed herein.

Virtualization environment 1700 can include general-purpose or special-purpose network hardware devices (or nodes) 1730 comprising a set of one or more processors or processing circuitry 1760, which can be commercial off-the-shelf (COTS) processors, dedicated Application Specific Integrated Circuits (ASICs), or any other type of processing circuitry including digital or analog hardware components or special purpose processors. Each hardware device can comprise memory 1790-1 which can be non-persistent memory for temporarily storing instructions 1795 or software executed by processing circuitry 1760. For example, instructions 1795 can include program instructions (also referred to as a computer program product) that, when executed by processing circuitry 1760, can configure hardware node 1720 to perform operations corresponding to various exemplary methods (e.g., procedures) described herein. Such operations can also be attributed to virtual node(s) 1720 that is/are hosted by hardware node 1730.

Each hardware device can comprise one or more network interface controllers (NICs) 1770), also known as network interface cards, which include physical network interface 1780. Each hardware device can also include non-transitory, persistent, machine-readable storage media 1790-2 having stored therein software 1795 and/or instructions executable by processing circuitry 1760. Software 1795 can include any type of software including software for instantiating one or more virtualization layers 1750 (also referred to as hypervisors), software to execute virtual machines 1740) as well as software allowing it to execute functions, features and/or benefits described in relation with some embodiments described herein.

Virtual machines 1740, comprise virtual processing, virtual memory, virtual networking or interface and virtual storage, and can be run by a corresponding virtualization layer 1750 or hypervisor. Different embodiments of the instance of virtual appliance 1720 can be implemented on one or more of virtual machines 1740, and the implementations can be made in different ways.

During operation, processing circuitry 1760 executes software 1795 to instantiate the hypervisor or virtualization layer 1750, which can sometimes be referred to as a virtual machine monitor (VMM). Virtualization layer 1750 can present a virtual operating platform that appears like networking hardware to virtual machine 1740).

As shown in FIG. 17, hardware 1730 can be a standalone network node with generic or specific components. Hardware 1730 can comprise antenna 17225 and can implement some functions via virtualization. Alternatively, hardware 1730 can be part of a larger cluster of hardware (e.g., such as in a data center or customer premise equipment (CPE)) where many hardware nodes work together and are managed via management and orchestration (MANO) 17100, which, among others, oversees lifecycle management of applications 1720.

Virtualization of the hardware is in some contexts referred to as network function virtualization (NFV). NFV can be used to consolidate many network equipment types onto industry standard high-volume server hardware, physical switches, and physical storage, which can be located in data centers, and customer premise equipment.

In the context of NFV, virtual machine 1740 can be a software implementation of a physical machine that runs programs as if they were executing on a physical, non-virtualized machine. Each of virtual machines 1740, and that part of hardware 1730 that executes that virtual machine, be it hardware dedicated to that virtual machine and/or hardware shared by that virtual machine with others of the virtual machines 1740, forms a separate virtual network elements (VNE).

Still in the context of NFV, Virtual Network Function (VNF) is responsible for handling specific network functions that run in one or more virtual machines 1740 on top of hardware networking infrastructure 1730 and corresponds to application 1720 in FIG. 17.

In some embodiments, one or more radio units 17200 that each include one or more transmitters 17220 and one or more receivers 17210 can be coupled to one or more antennas 17225. Radio units 17200 can communicate directly with hardware nodes 1730 via one or more appropriate network interfaces and can be used in combination with the virtual components to provide a virtual node with radio capabilities, such as a radio access node or a base station. Nodes arranged in this manner can also communicate with one or more UEs, such as described elsewhere herein.

In some embodiments, some signaling can be performed via control system 17230, which can alternatively be used for communication between the hardware nodes 1730 and radio units 17200.

Figure 18:
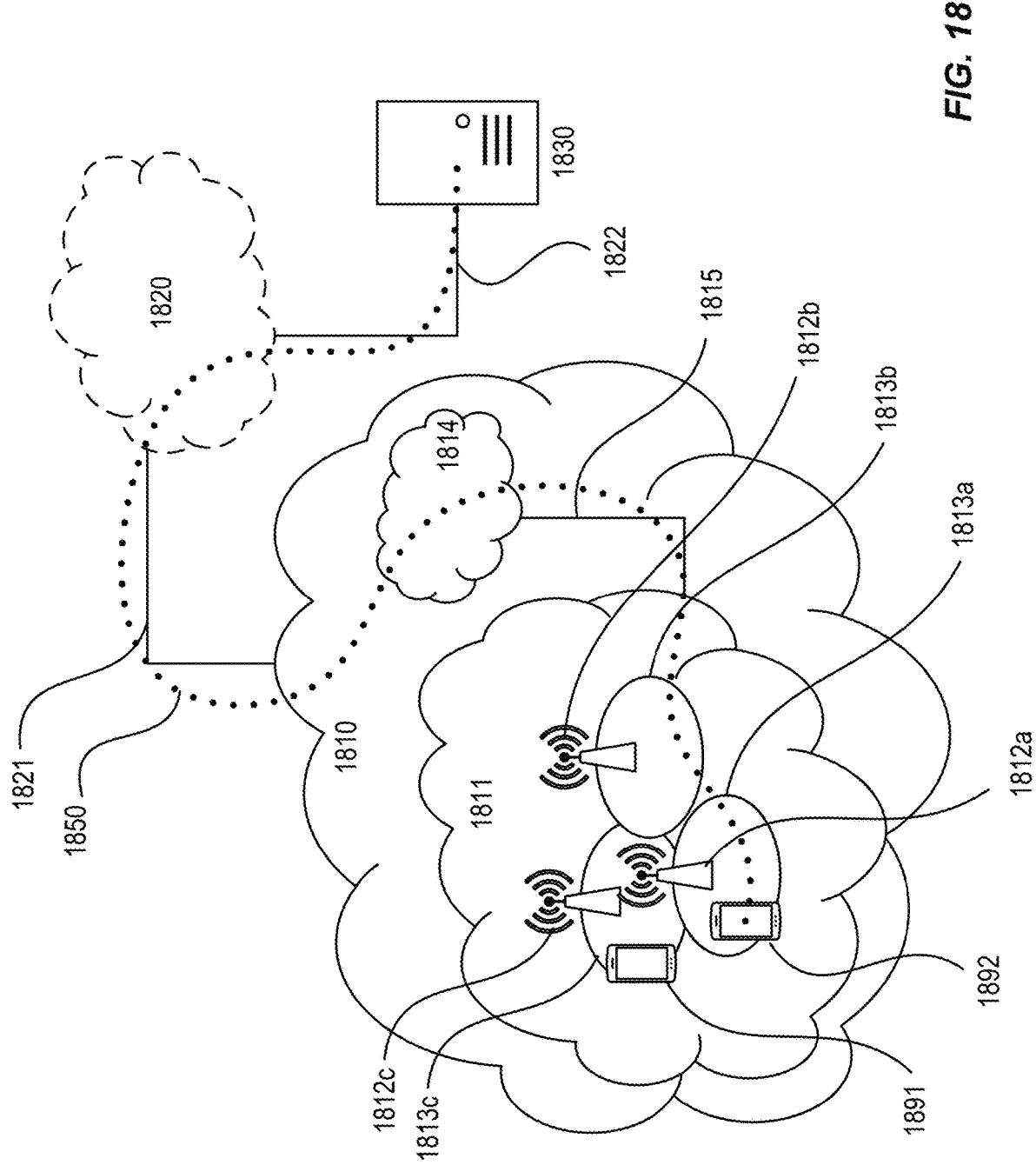
FIGS. 18-19 are block diagrams of exemplary communication systems and/or networks, according to various exemplary embodiments of the present disclosure.

With reference to FIG. 18, in accordance with an embodiment, a communication system includes telecommunication network 1810, such as a 3GPP-type cellular network, which comprises access network 1811, such as a radio access network, and core network 1814. Access network 1811 comprises a plurality of base stations 1812a, 1812b, 1812c, such as NBs, eNBs, gNBs or other types of wireless access points, each defining a corresponding coverage area 1813a. 1813b, 1813c. Each base station 1812a, 1812b, 1812c is connectable to core network 1814 over a wired or wireless connection 1815. A first UE 1891 located in coverage area 1813c can be configured to wirelessly connect to, or be paged by, the corresponding base station 1812c. A second UE 1892 in coverage area 1813a is wirelessly connectable to the corresponding base station 1812a. While a plurality of UEs 1891, 1892 are illustrated in this example, the disclosed embodiments are equally applicable to a situation where a sole UE is in the coverage area or where a sole UE is connecting to the base stations associated with the coverage area.

Telecommunication network 1810 is itself connected to host computer 1830, which can be embodied in the hardware and/or software of a standalone server, a cloud-implemented server, a distributed server or as processing resources in a server farm. Host computer 1830 can be under the ownership or control of a service provider or can be operated by the service provider or on behalf of the service provider. Connections 1821 and 1822 between telecommunication network 1810 and host computer 1830 can extend directly from core network 1814 to host computer 1830 or can go via an optional intermediate network 1820. Intermediate network 1820 can be one of, or a combination of more than one of, a public, private or hosted network; intermediate network 1820, if any, can be a backbone network or the Internet; in particular, intermediate network 1820) can comprise two or more sub-networks (not shown).

The communication system of FIG. 18 as a whole enables connectivity between the connected UEs 1891, 1892 and host computer 1830. The connectivity can be described as an over-the-top (OTT) connection 1850. Host computer 1830 and the connected UEs 1891, 1892 are configured to communicate data and/or signaling via OTT connection 1850, using access network 1811, core network 1814, any intermediate network 1820) and possible further infrastructure (not shown) as intermediaries. OTT connection 1850 can be transparent in the sense that the participating communication devices through which OTT connection 1850 passes are unaware of routing of uplink and downlink communications. For example, base station 1812 may not or need not be informed about the past routing of an incoming downlink communication with data originating from host computer 1830 to be forwarded (e.g., handed over) to a connected UE 1891. Similarly, base station 1812 need not be aware of the future routing of an outgoing uplink communication originating from the UE 1891 towards the host computer 1830.

Example implementations, in accordance with an embodiment, of the UE, base station and host computer discussed in the preceding paragraphs will now be described with reference to FIG. 19. In communication system 1900, host computer 1910 comprises hardware 1915 including communication interface 1916 configured to set up and maintain a wired or wireless connection with an interface of a different communication device of communication system 1900. Host computer 1910 further comprises processing circuitry 1918, which can have storage and/or processing capabilities. In particular, processing circuitry 1918 can comprise one or more programmable processors, application-specific integrated circuits, field programmable gate arrays or combinations of these (not shown) adapted to execute instructions. Host computer 1910 further comprises software 1911, which is stored in or accessible by host computer 1910 and executable by processing circuitry 1918. Software 1911 includes host application 1912. Host application 1912 can be operable to provide a service to a remote user, such as UE 1930 connecting via OTT connection 1950 terminating at UE 1930 and host computer 1910. In providing the service to the remote user, host application 1912 can provide user data which is transmitted using OTT connection 1950.

Communication system 1900 can also include base station 1920 provided in a telecommunication system and comprising hardware 1925 enabling it to communicate with host computer 1910 and with UE 1930. Hardware 1925 can include communication interface 1926 for setting up and maintaining a wired or wireless connection with an interface of a different communication device of communication system 1900, as well as radio interface 1927 for setting up and maintaining at least wireless connection 1970 with UE 1930 located in a coverage area (not shown in FIG. 19) served by base station 1920. Communication interface 1926 can be configured to facilitate connection 1960 to host computer 1910. Connection 1960 can be direct, or it can pass through a core network (not shown in FIG. 19) of the telecommunication system and/or through one or more intermediate networks outside the telecommunication system. In the embodiment shown, hardware 1925 of base station 1920 can also include processing circuitry 1928, which can comprise one or more programmable processors, application-specific integrated circuits, field programmable gate arrays or combinations of these (not shown) adapted to execute instructions.

Base station 1920 also includes software 1921 stored internally or accessible via an external connection. For example, software 1921 can include program instructions (also referred to as a computer program product) that, when executed by processing circuitry 1928, can configure base station 1920 to perform operations corresponding to various exemplary methods (e.g., procedures) described herein.

Communication system 1900 can also include UE 1930 already referred to, whose hardware 1935 can include radio interface 1937 configured to set up and maintain wireless connection 1970 with a base station serving a coverage area in which UE 1930 is currently located. Hardware 1935 of UE 1930 can also include processing circuitry 1938, which can comprise one or more programmable processors, application-specific integrated circuits, field programmable gate arrays or combinations of these (not shown) adapted to execute instructions.

UE 1930 also includes software 1931, which is stored in or accessible by UE 1930 and executable by processing circuitry 1938. Software 1931 includes client application 1932. Client application 1932 can be operable to provide a service to a human or non-human user via UE 1930, with the support of host computer 1910. In host computer 1910, an executing host application 1912 can communicate with the executing client application 1932 via OTT connection 1950 terminating at UE 1930 and host computer 1910. In providing the service to the user, client application 1932 can receive request data from host application 1912 and provide user data in response to the request data. OTT connection 1950 can transfer both the request data and the user data. Client application 1932 can interact with the user to generate the user data that it provides. Software 1931 can also include program instructions (also referred to as a computer program product) that, when executed by processing circuitry 1938, can configure UE 1930 to perform operations corresponding to various exemplary methods (e.g., procedures) described herein.

Figure 19:
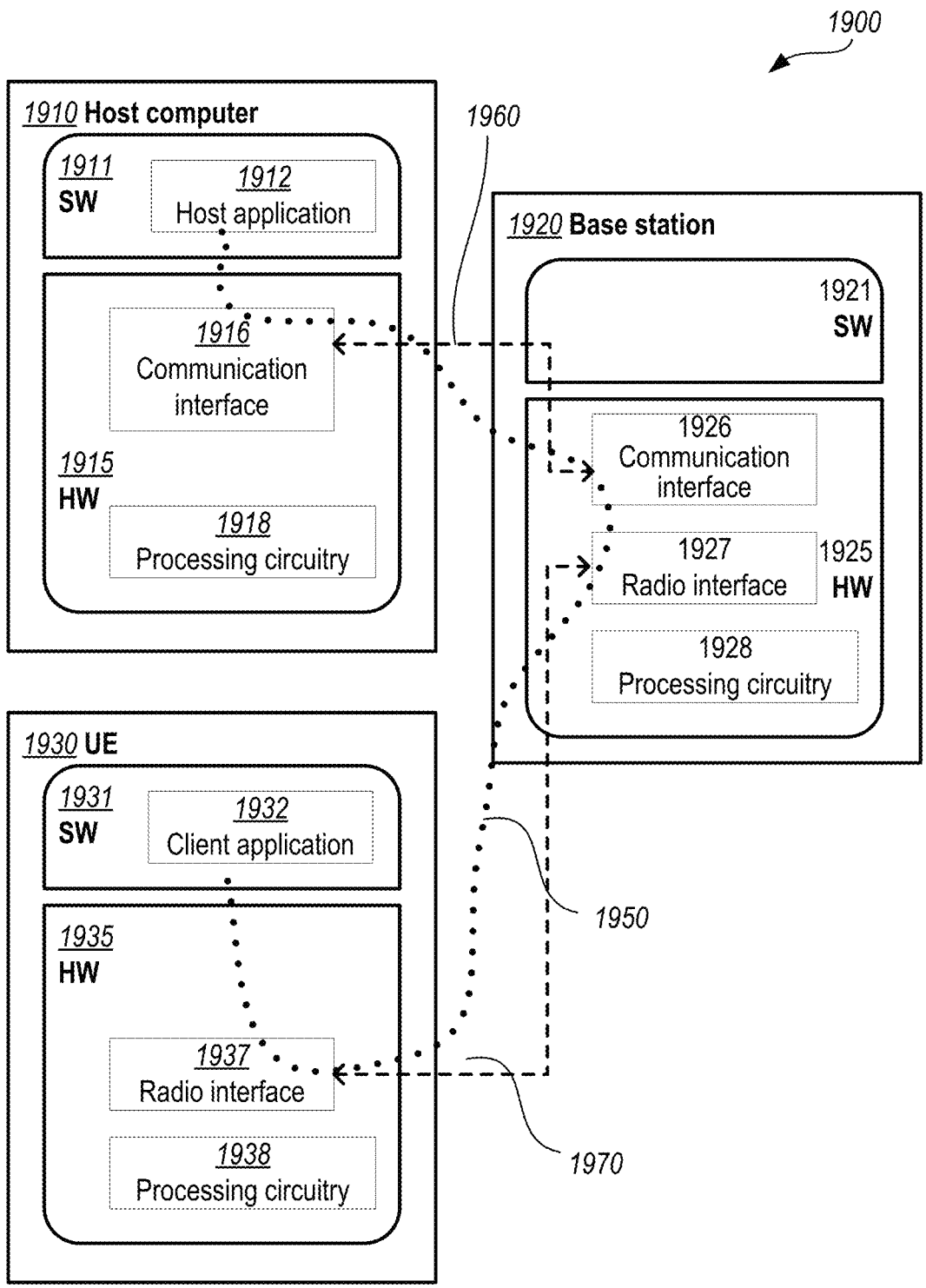

As an example, host computer 1910, base station 1920 and UE 1930 illustrated in FIG. 19 can be similar or identical to host computers or base stations described in relation to other figures herein. For example, the inner workings of these entities can be as shown in FIG. 19 and independently, the surrounding network topology can be that shown in other figures herein.

In FIG. 19, OTT connection 1950 has been drawn abstractly to illustrate the communication between host computer 1910 and UE 1930 via base station 1920, without explicit reference to any intermediary devices and the precise routing of messages via these devices. Network infrastructure can determine the routing, which it can be configured to hide from UE 1930 or from the service provider operating host computer 1910, or both. While OTT connection 1950 is active, the network infrastructure can further take decisions by which it dynamically changes the routing (e.g., on the basis of load balancing consideration or reconfiguration of the network).

Wireless connection 1970 between UE 1930 and base station 1920 is in accordance with the teachings of the embodiments described throughout this disclosure. One or more of the various embodiments improve the performance of OTT services provided to UE 1930 using OTT connection 1950, in which wireless connection 1970 forms the last segment. More precisely, the exemplary embodiments disclosed herein can improve flexibility for the network to monitor end-to-end quality-of-service (QOS) of data flows, including their corresponding radio bearers, associated with data sessions between a user equipment (UE) and another entity, such as an OTT data application or service external to the 5G network. These and other advantages can facilitate more timely design, implementation, and deployment of 5G/NR solutions. Furthermore, such embodiments can facilitate flexible and timely control of data session QoS, which can lead to improvements in capacity, throughput, latency, etc. that are envisioned by 5G/NR and important for the growth of OTT services.

A measurement procedure can be provided for the purpose of monitoring data rate, latency and other network operational aspects on which the one or more embodiments improve. There can further be an optional network functionality for reconfiguring OTT connection 1950 between host computer 1910 and UE 1930, in response to variations in the measurement results. The measurement procedure and/or the network functionality for reconfiguring OTT connection 1950 can be implemented in software 1911 and hardware 1915 of host computer 1910 or in software 1931 and hardware 1935 of UE 1930, or both. In embodiments, sensors (not shown) can be deployed in or in association with communication devices through which OTT connection 1950 passes: the sensors can participate in the measurement procedure by supplying values of the monitored quantities exemplified above, or supplying values of other physical quantities from which software 1911, 1931 can compute or estimate the monitored quantities. The reconfiguring of OTT connection 1950 can include message format, retransmission settings, preferred routing etc.; the reconfiguring need not affect base station 1920, and it can be unknown or imperceptible to base station 1920. Such procedures and functionalities can be known and practiced in the art. In certain embodiments, measurements can involve proprietary UE signaling facilitating host computer 1910's measurements of throughput, propagation times, latency and the like. The measurements can be implemented in that software 1911 and 1931 causes messages to be transmitted, in particular empty or 'dummy' messages, using OTT connection 1950 while it monitors propagation times, errors, etc.

FIG. 20 is a flowchart illustrating an exemplary method (e.g., procedure) implemented in a communication system, in accordance with one embodiment. The communication system includes a host computer, a base station and a UE which, in some exemplary embodiments, can be those described with reference to other figures herein. For simplicity of the present disclosure, only drawing references to FIG. 20 will be included in this section. In operation 2010, the host computer provides user data. In sub-operation 2011 (which can be optional) of operation 2010, the host computer provides the user data by executing a host application. In operation 2020, the host computer initiates a transmission carrying the user data to the UE. In operation 2030 (which can be optional), the base station transmits to the UE the user data which was carried in the transmission that the host computer initiated, in accordance with the teachings of the embodiments described throughout this disclosure. In operation 2040 (which can also be optional), the UE executes a client application associated with the host application executed by the host computer.

FIG. 21 is a flowchart illustrating an exemplary method (e.g., procedure) implemented in a communication system, in accordance with one embodiment. The communication system includes a host computer, a base station and a UE which can be those described with reference to other figures herein. For simplicity of the present disclosure, only drawing references to FIG. 21 will be included in this section. In operation 2110 of the method, the host computer provides user data. In an optional sub-operation (not shown) the host computer provides the user data by executing a host application. In operation 2120, the host computer initiates a transmission carrying the user data to the UE. The transmission can pass via the base station, in accordance with the teachings of the embodiments described throughout this disclosure. In operation 2130 (which can be optional), the UE receives the user data carried in the transmission.

FIG. 22 is a flowchart illustrating an exemplary method (e.g., procedure) implemented in a communication system, in accordance with one embodiment. The communication system includes a host computer, a base station and a UE which can be those described with reference to other figures herein. For simplicity of the present disclosure, only drawing references to FIG. 22 will be included in this section. In operation 2210 (which can be optional), the UE receives input data provided by the host computer. Additionally or alternatively, in operation 2220, the UE provides user data. In sub-operation 2221 (which can be optional) of operation 2220, the UE provides the user data by executing a client application. In sub-operation 2211 (which can be optional) of operation 2210, the UE executes a client application which provides the user data in reaction to the received input data provided by the host computer. In providing the user data, the executed client application can further consider user input received from the user. Regardless of the specific manner in which the user data was provided, the UE initiates, in sub-operation 2230 (which can be optional), transmission of the user data to the host computer. In operation 2240 of the method, the host computer receives the user data transmitted from the UE, in accordance with the teachings of the embodiments described throughout this disclosure.

FIG. 23 is a flowchart illustrating an exemplary method (e.g., procedure) implemented in a communication system, in accordance with one embodiment. The communication system includes a host computer, a base station and a UE which can be those described with reference to other figures herein. For simplicity of the present disclosure, only drawing references to FIG. 23 will be included in this section. In operation 2310 (which can be optional), in accordance with the teachings of the embodiments described throughout this disclosure, the base station receives user data from the UE. In operation 2320 (which can be optional), the base station initiates transmission of the received user data to the host computer. In operation 2330 (which can be optional), the host computer receives the user data carried in the transmission initiated by the base station.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various exemplary embodiments can be used together with one another, as well as interchangeably therewith, as should be understood by those having ordinary skill in the art.

The term unit, as used herein, can have conventional meaning in the field of electronics, electrical devices and/or electronic devices and can include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM). Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

Furthermore, functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

In addition, certain terms used in the present disclosure, including the specification, drawings and exemplary embodiments thereof, can be used synonymously in certain instances, including, but not limited to, e.g., data and information. It should be understood that, while these words and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In addition, certain terms used in the present disclosure, including the specification and drawings, can be used synonymously in certain instances (e.g., "data" and "information"). It should be understood, that although these terms (and/or other terms that can be synonymous to one another) can be used synonymously herein, there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

Example embodiments of the techniques and apparatus described herein include, but are not limited to, the following enumerated embodiments:

A1. A method for a first node serving a user equipment (UE) in a first cell of a wireless network, the method comprising:
  sending, to the UE, a plurality of first reference time information messages, each including an absolute reference time and a corresponding event within downlink (DL) transmissions by the first node in the first cell;
  initiating a mobility operation for the UE, whereby upon successful completion of the mobility operation, the UE no longer communicates with the first node via the first cell; and
  sending, to a second node in the wireless network, a mobility-related message comprising information associated with the first reference time information messages sent by the first node.

A2. The method of embodiment A1, wherein the information associated with the first reference time information messages includes one or more of the following:
  a first indication of the UE's preference for receiving reference time information messages from the wireless network;
  a second indication of a periodicity of the first reference time information messages;
  a third indication of a time when a most recent first reference time information message was transmitted by the first node;
  a fourth indication of the accuracy of the first reference time information messages;
  a fifth indication of the UE's required time synchronization accuracy;
  a sixth indication of a clock source for the absolute reference times in the first reference time information messages.

A3. The method of any of embodiments A1-A2, further comprising receiving, from the UE, a reference time preference message including one or more of the following:
  the first indication of the UE's preference for receiving reference time information messages from the wireless network;
  an indication of a preferred minimum periodicity for receiving reference time information messages from the wireless network; and
  the fifth indication of the UE's required time synchronization accuracy.

A4. The method of embodiment A3, wherein the periodicity indicated by the second indication is at least as frequent as the preferred minimum periodicity.

A5. The method of any of embodiments A1-A4, wherein:
  the mobility operation is a handover of the UE to a second cell served by the second node; and
  the mobility-related message is a handover request.

A6. The method of embodiment A5, wherein:
  the method further comprises receiving, from the second node, a message indicating that the handover request is rejected; and
  the message includes a cause value indicating that the second node is not synchronized to a clock source for the absolute reference times in the first reference time information messages.

A7. The method of embodiment A5, wherein:
  the method further comprises receiving, from the second node, a message indicating that the handover request is accepted; and the message includes a reconfiguration message, for the UE, that instructs the UE to transmit a reference time preference message to the second node after completing the handover.

A8. The method of any of embodiments A5-A7, wherein:
the method further comprises receiving, from the second node, a seventh indication that the second node is capable of providing reference time information messages; and
initiating the mobility operation comprises selecting the second cell based on the seventh indication.

A9. The method of any of embodiments A1-A4, wherein:
the first node is a master node (MN) in dual connectivity (DC) towards the UE together with the second node as a secondary node (SN); and
the mobility operation is a MN change from the first node to a third node.

B1. A method for a second node serving a second cell in a wireless network, the method comprising:
receiving, from a first node serving the UE in the wireless network, a mobility-related message comprising information associated with a plurality of first reference time information messages transmitted by the first node to the UE;
based on the received information, determining whether the second node can support reference time information delivery to the UE in the second cell; and
based on determining that the second node can support reference time information delivery to the UE, transmitting one or more second reference time information messages to the UE, each including an absolute reference time and a corresponding reference event within downlink (DL) transmissions by the second node.

B2. The method of embodiment B1, wherein the information associated with the first reference time information messages sent by the first node includes one or more of the following:
a first indication of the UE's preference for receiving reference time information messages from the wireless network;
a second indication of a periodicity of the first reference time information messages transmitted by the first node;
a third indication of a time when a most recent first reference time information message was transmitted by the first node;
a fourth indication of the accuracy of the first reference time information messages;
a fifth indication of the UE's required time synchronization accuracy;
a sixth indication of a clock source for the absolute reference times in the first reference time information messages transmitted by the first node.

B3. The method of embodiment B2, wherein the periodicity indicated by the second indication is at least as frequent as the UE's preferred minimum periodicity.

B3A. The method of any of embodiments B2-B3, further comprising determining a latest time for transmitting an initial one of the second reference time information messages based on the third indication and the fifth indication.

B4. The method of any of embodiments B1-B3A, wherein transmitting the second reference time information messages comprises:
transmitting at least one of the second reference time information messages;
subsequently receiving, from the UE, a reference time preference message;
adjusting timing and/or periodicity for the second reference time information messages based on the contents of the reference time preference message; and
transmitting subsequent second reference time information messages according to the adjusted timing and/or periodicity.

B5. The method of embodiment B4, wherein the reference time preference message includes one or more of the following:
an indication of the UE's preference for receiving periodic reference time information messages from the wireless network;
an indication of a preferred minimum periodicity for receiving reference time information messages from the wireless network; and
an indication of the UE's required time synchronization accuracy.

B6. The method of any of embodiments B1-B5, wherein the mobility-related message is a handover request for the UE to the second cell.

B7. The method of embodiment B6, wherein:
the handover request includes a sixth indication of a clock source for the absolute reference times in the first reference time information messages transmitted by the first node; and
determining whether the second node can support reference time information delivery to the UE comprises determining whether the second node is synchronized to the clock source indicated by the sixth indication.

B8. The method of embodiment B7, further comprising, based on determining that the second node is not synchronized to the clock source indicated by the sixth indication, sending the first node a message indicating one of the following:
that the handover request is accepted: or
that the handover request is rejected together with a cause value indicating that the second node is not synchronized to the clock source indicated by the sixth indication.

B9. The method of embodiment B8, wherein the message indicating that the handover request is accepted includes a reconfiguration message, for the UE, that instructs the UE to transmit a reference time preference message to the second node after completing the handover.

B10. The method of any of embodiments B6-B9, further comprises sending, to the first node, a seventh indication that the second node is capable of providing reference time information messages.

B11. The method of any of embodiments B6-B10, wherein:
the second node comprises a centralized unit (CU) and a distributed unit (DU);
the method further comprises, based on determining that the second node can support reference time information delivery to the UE, performing one of the following operations by the CU:
initiating reference time information reporting by the DU to the CU;
adjusting a periodicity of ongoing reference time information reporting by the DU to the CU;
initiating broadcasting of reference time information messages by the DU: or
adjusting a periodicity of ongoing broadcasting of reference time information messages by the DU.

B12. The method of embodiment B11, wherein at least a portion of the second reference time information messages are unicast messages formed by the CU based on reference time information reported by the DU.

B13. The method of any of embodiments B1-B5, wherein:
the first node is a master node (MN) in dual connectivity (DC) towards the UE together with the second node as a secondary node (SN); and
the mobility operation is a MN change from the first node to a third node.

B14. The method of embodiment B13, further comprising, before receiving the mobility-related message from the MN, transmitting one or more previous second reference time information messages to the UE, each including an absolute reference time and a corresponding event within downlink (DL) transmissions by the SN.

B15. The method of embodiment B13, wherein
the second reference time information messages are transmitted during the mobility operation; and
the method further comprises, after completion of the mobility operation, sending, to the third node, a message comprising information associated with the second reference time information messages sent by the second node to the UE.

B16. The method of any of embodiments B1-B15, wherein:
the event is an ending boundary of a subframe of DL transmissions by the second node in a primary cell of a cell group assigned to the UE; and
the reference time information messages are transmitted on a signaling radio bearer (SRB) associated with the cell group.

C1. A first node configured to serve a user equipment (UE) in a first cell of a wireless network, the first node comprising:
communication interface circuitry configured to communicate with the UE and with a second node serving a second cell in the wireless network; and
processing circuitry operably coupled with the communication interface circuitry, whereby the processing circuitry and the communication interface circuitry are configured to perform operations corresponding to any of the methods of embodiments A1-A9.

C2. A first node configured to serve a user equipment (UE) in a first cell of a wireless network, the first node being further arranged to perform operations corresponding to any of the methods of embodiments A1-A9.

C3. A non-transitory, computer-readable medium storing program instructions that, when executed by processing circuitry of a first node configured to serve a user equipment (UE) in a first cell of a wireless network, configure the first node to perform operations corresponding to any of the methods of embodiments A1-A9.

C4. A computer program product comprising program instructions that, when executed by processing circuitry of a first node configured to serve a user equipment (UE) in a first cell of a wireless network, configure the first node to perform operations corresponding to any of the methods of embodiments A1-A9.

D1. A second node configured to serve a second cell in a wireless network, the second node comprising:
communication interface circuitry configured to communicate with a user equipment (UE) and with a first node serving a first cell in the wireless network; and
processing circuitry operably coupled with the communication interface circuitry, whereby the processing circuitry and the communication interface circuitry are configured to perform operations corresponding to any of the methods of embodiments B1-B16.

D2. A second node configured to serve a second cell in a wireless network, the second node being further arranged to perform operations corresponding to any of the methods of embodiments B1-B16.

D3. A non-transitory, computer-readable medium storing program instructions that, when executed by processing circuitry of a second node configured to serve a second cell in a wireless network, configure the second node to perform operations corresponding to any of the methods of embodiments B1-B16.

D4. A computer program product comprising program instructions that, when executed by processing circuitry of a second node configured to serve a second cell in a wireless network, configure the second node to perform operations corresponding to any of the methods of embodiments B1-B16.

The invention claimed is:

1. A method for a second node configured to serve a second cell in a wireless network, the method comprising:
receiving, from a first node in the wireless network, a mobility-related message comprising information associated with a plurality of first reference time information messages transmitted by the first node to a user equipment (UE);
based on the received information, determining whether the second node can support reference time information delivery to the UE in the second cell; and
based on determining that the second node can support reference time information delivery to the UE, transmitting one or more second reference time information messages to the UE, wherein each second reference time information message includes an absolute reference time and a corresponding reference event within downlink (DL) transmissions by the second node.

2. The method of claim 1, wherein the information associated with the first reference time information messages transmitted by the first node includes one or more of the following:
a first indication of the UE's preference for receiving reference time information messages from the wireless network;
a second indication of a periodicity of the first reference time information messages transmitted by the first node;
a third indication of a time when a most recent first reference time information message was transmitted by the first node;
a fourth indication of the accuracy of the first reference time information messages;
a fifth indication of the UE's required time synchronization accuracy;
a sixth indication of a clock source for the absolute reference times in the first reference time information messages transmitted by the first node.

3. The method of claim 2, further comprising determining a latest time for transmitting an initial one of the second reference time information messages based on the third indication and the fifth indication.

4. The method of claim 1, wherein transmitting the second reference time information messages comprises:
transmitting at least one of the second reference time information messages;
subsequently receiving, from the UE, a reference time preference message;
adjusting timing and/or periodicity for the second reference time information messages based on the contents of the reference time preference message; and
transmitting subsequent second reference time information messages according to the adjusted timing and/or periodicity.

5. The method of claim 4, wherein the reference time preference message includes one or more of the following:
an indication of the UE's preference for receiving periodic reference time information messages from the wireless network;
an indication of a preferred minimum periodicity for receiving reference time information messages from the wireless network; and
an indication of the UE's required time synchronization accuracy.

6. The method of claim 1, wherein the mobility-related message is a handover request for the UE to the second cell.

7. The method of claim 6, wherein:
the handover request includes a sixth indication of a clock source for the absolute reference times in the first reference time information messages transmitted by the first node; and
determining whether the second node can support reference time information delivery to the UE comprises determining whether the second node is synchronized to the clock source indicated by the sixth indication.

8. The method of claim 7, further comprising, based on determining that the second node is not synchronized to the clock source indicated by the sixth indication, sending the first node a message indicating one of the following:
that the handover request is accepted; or
that the handover request is rejected together with a cause value indicating that the second node is not synchronized to the clock source indicated by the sixth indication.

9. The method of claim 8, wherein the message indicating that the handover request is accepted includes a reconfiguration message, for the UE, that instructs the UE to transmit a reference time preference message to the second node after completing the handover.

10. The method of claim 6, further comprises sending, to the first node, a seventh indication that the second node is capable of providing reference time information messages.

11. The method of claim 6, wherein:
the second node comprises a centralized unit (CU) and a distributed unit (DU);
the method further comprises, based on determining that the second node can support reference time information delivery to the UE, performing one of the following operations by the CU:
initiating reference time information reporting by the DU to the CU;
adjusting a periodicity of ongoing reference time information reporting by the DU to the CU;
initiating broadcasting of reference time information messages by the DU; or
adjusting a periodicity of ongoing broadcasting of reference time information messages by the DU.

12. The method of claim 11, wherein at least a portion of the second reference time information messages are unicast messages formed by the CU based on reference time information reported by the DU.

13. The method of claim 1, wherein:
the first node is a master node (MN) in dual connectivity (DC) towards the UE together with the second node as a secondary node (SN); and
the mobility operation is a MN change from the first node to a third node in the wireless network.

14. The method of claim 13, further comprising, before receiving the mobility-related message from the MN, transmitting one or more previous second reference time information messages to the UE, each previous second reference time information message including an absolute reference time and a corresponding reference event within DL transmissions by the SN.

15. The method of claim 13, wherein
the second reference time information messages are transmitted during the mobility operation; and
the method further comprises, after completion of the mobility operation, sending, to the third node, a message comprising information associated with the second reference time information messages sent by the second node to the UE.

16. The method of claim 1, wherein:
the reference event is an ending boundary of a subframe of DL transmissions by the second node in a primary cell of a cell group assigned to the UE; and
the reference time information messages are transmitted on a signaling radio bearer, SRB, associated with the cell group.

17. A method for a first node configured to serve a first cell in a wireless network, the method comprising:
sending a plurality of first reference time information messages to a user equipment (UE), wherein each first reference time information message includes an absolute reference time and a corresponding reference event within downlink (DL) transmissions by the first node in the first cell;
initiating a mobility operation for the UE, whereby upon successful completion of the mobility operation, the UE no longer communicates with the first node via the first cell; and
sending, to a second node in the wireless network, a mobility-related message comprising information associated with the first reference time information messages sent by the first node.

18. The method of claim 17, wherein the information associated with the first reference time information messages includes one or more of the following:
a first indication of the UE's preference for receiving reference time information messages from the wireless network;
a second indication of a periodicity of the first reference time information messages;
a third indication of a time when a most recent first reference time information message was transmitted by the first node;
a fourth indication of the accuracy of the first reference time information messages;
a fifth indication of the UE's required time synchronization accuracy;
a sixth indication of a clock source for the absolute reference times in the first reference time information messages.

19. The method of claim 17, further comprising receiving, from the UE, a reference time preference message including one or more of the following:
the first indication of the UE's preference for receiving reference time information messages from the wireless network;
an indication of a preferred minimum periodicity for receiving reference time information messages from the wireless network; and
the fifth indication of the UE's required time synchronization accuracy.

20. The method of claim 17, wherein:
the mobility operation is a handover of the UE to a second cell served by the second node; and
the mobility-related message is a handover request.

21. The method of claim 20, wherein:
the method further comprises receiving, from the second node, a message indicating that the handover request is rejected; and
the message includes a cause value indicating that the second node is not synchronized to a clock source for the absolute reference times in the first reference time information messages.

22. The method of claim 20, wherein:
the method further comprises receiving, from the second node, a message indicating that the handover request is accepted; and
the message includes a reconfiguration message, for the UE, that instructs the UE to transmit a reference time preference message to the second node after completing the handover.

23. The method of claim 20, wherein:
the method further comprises receiving, from the second node, a seventh indication that the second node is capable of providing reference time information messages; and
initiating the mobility operation comprises selecting the second cell based on the seventh indication.

24. The method of claim 17, wherein:
the first node is a master node (MN) in dual connectivity (DC) towards the UE together with the second node as a secondary node (SN); and
the mobility operation is a MN change from the first node to a third node in the wireless network.

25. A second node configured to serve a second cell in a wireless network, the second node comprising:
communication interface circuitry configured to communicate with a user equipment (UE) and with a first node configured to serve a first cell in the wireless network; and
processing circuitry operably coupled with the communication interface circuitry, whereby the processing circuitry and the communication interface circuitry are configured to:
receive, from the first node, a mobility-related message comprising information associated with a plurality of first reference time information messages transmitted by the first node to the UE;
based on the received information, determine whether the second node can support reference time information delivery to the UE in the second cell; and
based on determining that the second node can support reference time information delivery to the UE, transmit one or more second reference time information messages to the UE, each second reference time information message including an absolute reference time and a corresponding reference event within downlink (DL) transmissions by the second node.

26. A first node configured to serve a first cell in a wireless network, the first node comprising:
communication interface circuitry configured to communicate with a user equipment (UE) and with a second node configured to serve a second cell in the wireless network; and
processing circuitry operably coupled with the communication interface circuitry, whereby the processing circuitry and the communication interface circuitry are configured to:
send a plurality of first reference time information messages to the UE, wherein each first reference time information message includes an absolute reference time and a corresponding reference event within downlink (DL) transmissions by the first node in the first cell;
initiate a mobility operation for the UE, whereby upon successful completion of the mobility operation, the UE no longer communicates with the first node via the first cell; and
send, to a second node in the wireless network, a mobility-related message comprising information associated with the first reference time information messages sent by the first node.

* * * * *